United States Patent
Nishimura et al.

(10) Patent No.: US 9,608,927 B2
(45) Date of Patent: Mar. 28, 2017

(54) PACKET EXCHANGING DEVICE, TRANSMISSION APPARATUS, AND PACKET SCHEDULING METHOD

(71) Applicant: FUJITSU LIMITED, Kawasaki-shi, Kanagawa (JP)

(72) Inventors: Kazuto Nishimura, Yokohama (JP); Atsushi Kitada, Kawasaki (JP); Hiroshi Tomonaga, Kawasaki (JP); Tsutomu Noguchi, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 198 days.

(21) Appl. No.: 14/100,327

(22) Filed: Dec. 9, 2013

(65) Prior Publication Data

US 2014/0192819 A1   Jul. 10, 2014

(30) Foreign Application Priority Data

Jan. 9, 2013  (JP) ................................ 2013-001557

(51) Int. Cl.
*H04L 12/28* (2006.01)
*H04L 12/873* (2013.01)
*H04L 12/863* (2013.01)
*H04L 12/931* (2013.01)
*H04L 12/935* (2013.01)

(52) U.S. Cl.
CPC .......... *H04L 47/527* (2013.01); *H04L 47/621* (2013.01); *H04L 49/206* (2013.01); *H04L 49/3018* (2013.01); *H04L 49/505* (2013.01)

(58) Field of Classification Search
CPC . H04L 47/527; H04L 49/3018; H04L 49/505; H04L 49/206; H04L 47/621
See application file for complete search history.

(56) References Cited

U.S. PATENT DOCUMENTS

| | | |
|---|---|---|
| 5,063,562 A | 11/1991 | Barzilai et al. |
| 6,754,215 B1 | 6/2004 | Arikawa et al. |
| 7,990,858 B2 | 8/2011 | Iny |
| 9,015,019 B1 | 4/2015 | Kim et al. |
| 2005/0047425 A1 | 3/2005 | Liu et al. |

(Continued)

FOREIGN PATENT DOCUMENTS

| | | |
|---|---|---|
| JP | 7-74780 | 3/1995 |
| JP | 2000-295281 | 10/2000 |

(Continued)

OTHER PUBLICATIONS

U.S. Office Action dated Sep. 9, 2015 in related U.S. Appl. No. 14/141,975.

(Continued)

*Primary Examiner* — Kiet Tang
(74) *Attorney, Agent, or Firm* — Staas & Halsey LLP

(57) ABSTRACT

A packet exchanging device includes queues each configured to accumulate one or more packets, a scheduler unit configured to give a certain permissible reading amount indicating amounts of data of readable packets to each of the queues, and a reading processing unit configured to read the one or more packets from the queues by the permissible reading amount in an order in which a reading condition regarding the permissible reading amount for each queue and an amount of data in the one or more packets accumulated in each queue is satisfied.

14 Claims, 22 Drawing Sheets

(56) References Cited

U.S. PATENT DOCUMENTS

| | | | |
|---|---|---|---|
| 2005/0141424 A1* | 6/2005 | Lim | H04L 12/5693 370/235 |
| 2005/0243853 A1 | 11/2005 | Bitar et al. | |
| 2007/0121499 A1 | 5/2007 | Pal et al. | |
| 2008/0219165 A1 | 9/2008 | Kusumoto | |
| 2009/0296729 A1* | 12/2009 | Urano | H04L 47/10 370/412 |

FOREIGN PATENT DOCUMENTS

| | | |
|---|---|---|
| JP | 2001-223740 | 8/2001 |
| JP | 2005-33408 | 2/2005 |
| JP | 2005-286383 | 10/2005 |
| JP | 2009-290633 | 12/2009 |
| JP | 2011-166342 | 8/2011 |

OTHER PUBLICATIONS

Office Action issued May 13, 2016 in corresponding U.S. Appl. No. 14/141,975.
Office Action mailed Aug. 12, 2016 in co-pending U.S. Appl. No. 14/141,975.
U.S. Appl. No. 14/141,975, filed Dec. 27, 2013, Atsushi Kitada, Fujitsu Limited.
Japanese Office Action mailed Jul. 26, 2016 in related Japanese Application No. 2013-001557.
Japanese Office Action mailed Oct. 4, 2016 in related Japanese Application No. 2013-059050.
Final Office Action dated Jan. 20, 2017 in co-pending U.S. Appl. No. 14/141,975.

\* cited by examiner

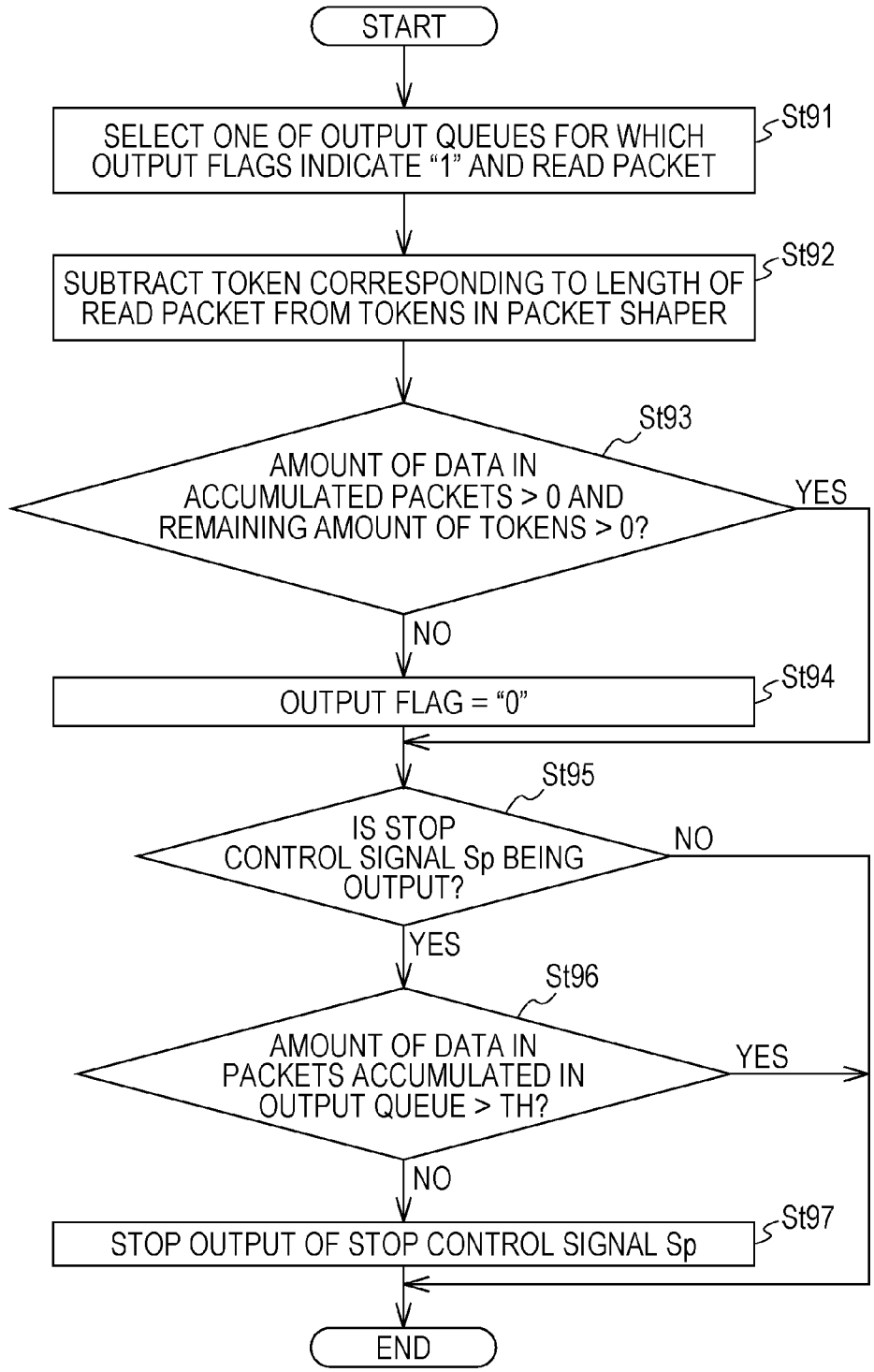

PACKET EXCHANGING DEVICE, TRANSMISSION APPARATUS, AND PACKET SCHEDULING METHOD

CROSS-REFERENCE TO RELATED APPLICATIONS

This application is based upon and claims the benefit of priority of the prior Japanese Patent Application No. 2013-001557, filed on Jan. 9, 2013, the entire contents of which are incorporated herein by reference.

FIELD

The embodiments discussed herein are related to a packet exchanging device, a transmission apparatus, and a packet scheduling method.

BACKGROUND

With increased demands for communications, there are demands for improving the throughputs of switching equipment, such as layer 2 switches and routers, that is, the throughputs of transmission apparatuses that transmit packets. An improvement in scheduling functions for managing traffic by performing reading control on packets from queues has been proposed in order to enhance the throughputs.

For example, Japanese Laid-open Patent Publication No. 2001-223740 discloses a technique in which granularity is set based on statistical observation information in a deficit round robin (DRR) method. Japanese Laid-open Patent Publication No. 2005-33408 discloses a technique in which the band accuracy of an algorithm for maintaining band control is maintained when data is read from a queue selected by another algorithm.

Japanese Laid-open Patent Publication No. 2005-286383 discloses a technique in which scheduling is performed in units of fixed segment length for each queue in which packets are stored, to thereby reduce the access processing time for an external memory. U.S. Pat. No. 7,990,858 discloses, in a configuration in which an input controller and an output-band controller are connected through a fabric, the input controller outputs a packet to the output-band controller through the fabric, based on a credit obtained from the output-band controller by issuing a request.

When a next queue from which a packet is to be read is selected by scheduling each time one packet is read from a queue, the processing time permitted for the scheduling is restricted by the time for packet-reading processing. Thus, the processing time permitted for the scheduling depends on the length (that is, the amount of data) of a packet to be read, when the packet length is variable, such as an Ethernet (registered trademark) frame.

For example, when the communication speed is assumed to be 100 Gbps, the processing time permitted for the scheduling is about 121 ns for a packet having a length of 1500 bytes and is about 6.7 ns for a packet having a length of 64 bytes. That is, when short packets are sequentially read, the time permitted for the scheduling is limited to a relatively short time, thus involving high processing performance for the scheduling.

For example, when only short packets are read, the scheduling involves a processing speed of about 148.8 Mbps. The processing speed is further increased when a complicated algorithm is used for the scheduling.

In contrast, when the reading processing is performed for each predetermined amount of data, not for each packet, one or more packets can be handled as bursty traffic and can be sequentially read. Thus, the restriction on the time permitted for the scheduling is alleviated. For example, when the reading processing is performed on a 500-byte basis, eight packets each having a length of 64 bytes can be sequentially read, and thus the processing time permitted for the scheduling is about 53.6 (ns) (=about 6.7 (ns)×8).

In this case, however, since one packet is not divided for reading, part of data in packets is read as an excess amount that exceeds the aforementioned predetermined amount of data. Since the excess amount of data varies depending on the packet length, there is a problem in that bandwidths of queues become unfair. For example, since an Ethernet frame has a variable length of 64 to 1518 bytes, the excess amount of data varies in the range of up to 63 to 1517 bytes.

In the case described above, since no packets are read until the amount of data accumulated in a queue exceeds a predetermined amount of data. Thus, when short packets are input to a queue at a low rate, there is a problem in that the amount of packet delay increases. For example, in a Voice over Internet Protocol (VoIP), packets containing audio data are short packets in many cases, which may cause trouble to phone calls. Such a problem is not limited to Ethernet frames, and also occurs with other packets, such as internet protocol (IP) packets.

Japanese Laid-open Patent Publication Nos. 2001-223740, 2005-33408, 2005-286383, and U.S. Pat. No. 7,990,858 are examples of related arts.

SUMMARY

According to an aspect of the embodiments, a packet exchanging device includes queues each configured to accumulate one or more packets, a scheduler unit configured to give a certain permissible reading amount indicating amounts of data of readable packets to each of the queues, and a reading processing unit configured to read the one or more packets from the queues by the permissible reading amount in an order in which a reading condition regarding the permissible reading amount for each queue and an amount of data in the one or more packets accumulated in each queue is satisfied.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 22 is a flowchart illustrating an operation example of the output-band control unit when a packet is read from the output queues.

DESCRIPTION OF EMBODIMENTS

Figure 1:
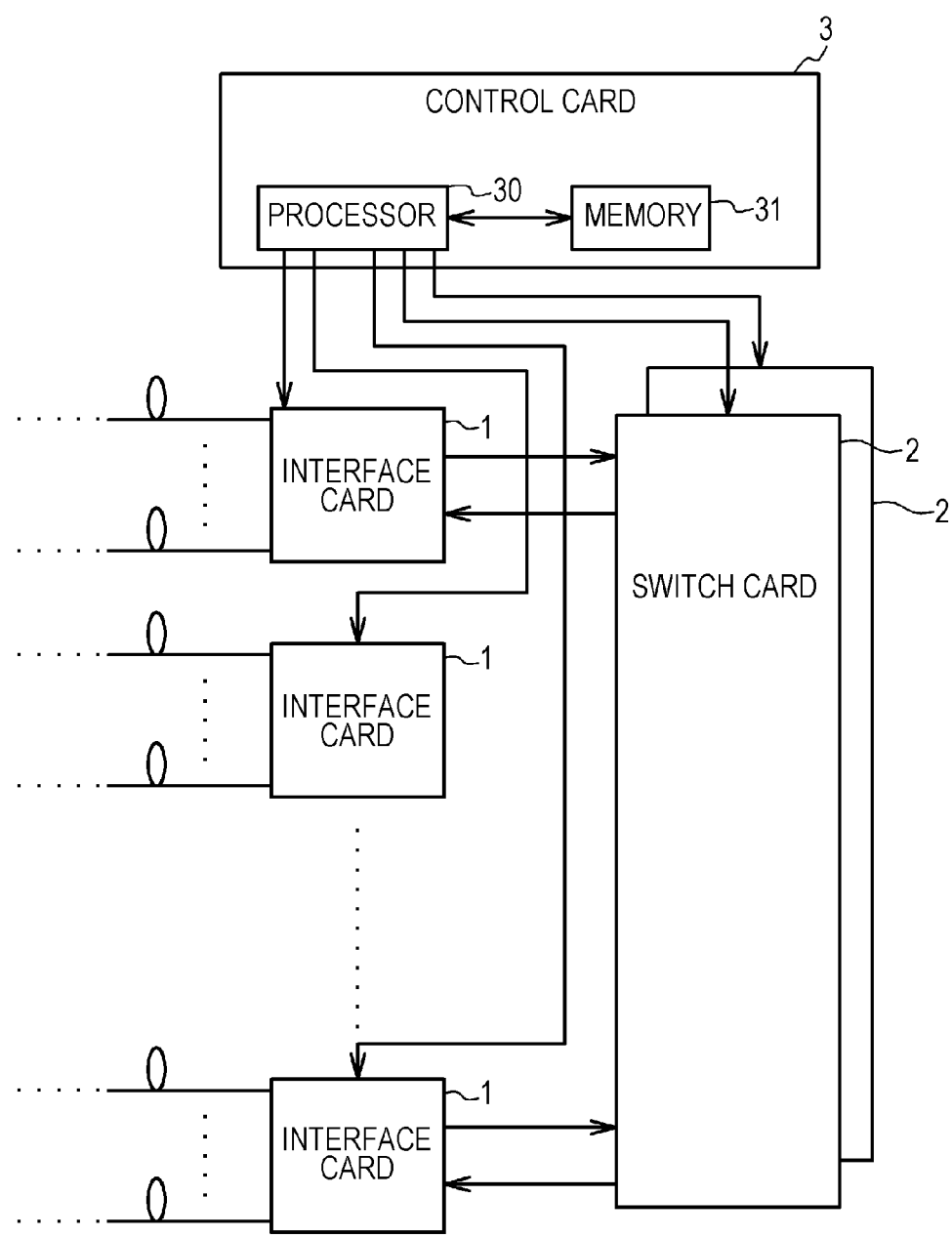
FIG. 1 is a block diagram illustrating the functional configuration of a transmission apparatus according to an embodiment.

FIG. 1 is a block diagram illustrating the functional configuration of a transmission apparatus according to an embodiment. The transmission apparatus includes network interface cards (packet exchanging devices) 1, two switch cards (switch devices) 2, and a control card 3. The network interface cards 1, the switch cards 2, and the control card 3 are accommodated in individual slots provided in a housing of the transmission apparatus and are electrically coupled to each other. Although an example in which the transmission apparatus is switching equipment, such as a layer 2 switch or a router, will be described by way of example, the present technology is not limited thereto.

The transmission apparatus receives packets from an external apparatus and relays the packets to another external apparatus in accordance with destination addresses of the packets. The term "packets" as used herein refers to units of transmission of data (information) to be transmitted, and Ethernet frames will be exemplified by way of example. The packets, however, are not limited this example, and may be any other frames, such as IP packets.

Each of the network interface cards 1 transmits/receives packets to/from an external apparatus. Examples of the external apparatus include terminal apparatuses, such as personal computers, as well as server apparatuses and routers. The network interface cards 1 have a plurality of ports coupled to optical fibers to perform communication based on, for example, the 1000BASE-SX standard.

Each of the two switch cards 2 exchanges packets with the network interface cards 1. More specifically, each switch card 2 receives a packet from one network interface card 1 and outputs the packet to another network interface card 1 corresponding to the destination address of the packet. The two switch cards 2 are used as a working system and a backup system, respectively, for example, in preparation for failures, such as hardware breakdown.

The control card 3 controls the network interface cards 1 and the two switch cards 2. The control card 3 is coupled to a network control apparatus or the like and performs, for example, processing for a user interface, setting processing for the network interface cards 1 and the switch cards 2, processing for collecting information from the network interface cards 1 and the switch cards 2. The control card 3 has a processor 30, which may be a central processing unit (CPU) for executing the above-described processing, and a memory 31.

Figure 2:
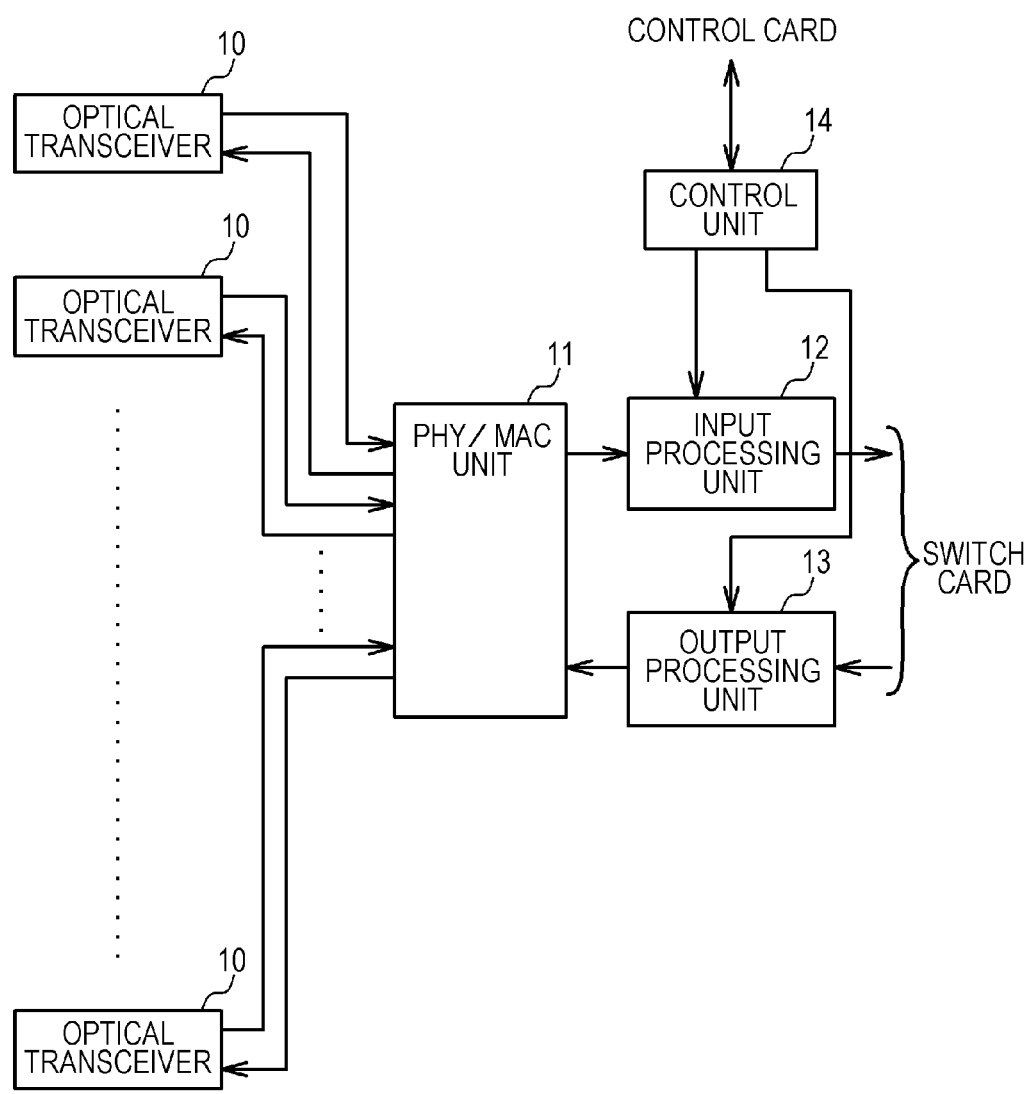
FIG. 2 is a block diagram illustrating the functional configuration of each network interface card.

FIG. 2 is a block diagram illustrating the functional configuration of each network interface card 1. The network interface card 1 includes optical transceivers 10, a PHY/MAC unit 11, an input processing unit 12, an output processing unit 13, and a control unit 14.

Upon receiving an optical signal from an external apparatus through an optical fiber, each of the optical transceivers 10 converts the optical signal into an electrical signal and outputs the electrical signal to the PHY/MAC unit 11. Upon input of an electrical signal from the PHY/MAC unit 11, each optical transceiver 10 converts the electrical signal into an optical signal and transmits the optical signal to an external apparatus through an optical fiber. That is, the optical transceivers 10 serve as ports for transmitting/receiving packets to/from external apparatuses.

The PHY/MAC unit 11 performs processing for establishing links with external apparatuses and processing for distributing packets to the optical transceivers 10. The PHY/MAC unit 11 outputs packets, input from the optical transceivers 10, to the input processing unit 12, and outputs packets, input from the output processing unit 13, to the optical transceivers 10.

The input processing unit 12 and the output processing unit 13 perform ingress packet processing and egress packet processing, respectively. The input processing unit 12 performs band control processing and so on on a packet and outputs the resulting packet to one or both of the switch cards 2. The output processing unit 13 performs band control processing and so on on a packet input from one or both of the switch cards 2 and outputs the resulting packet to the PHY/MAC unit 11.

The control unit 14 communicates with the control card 3 to control the input processing unit 12 and the output processing unit 13. The control unit 14 has a processor, such as a CPU, and a memory (not illustrated).

Figure 3:
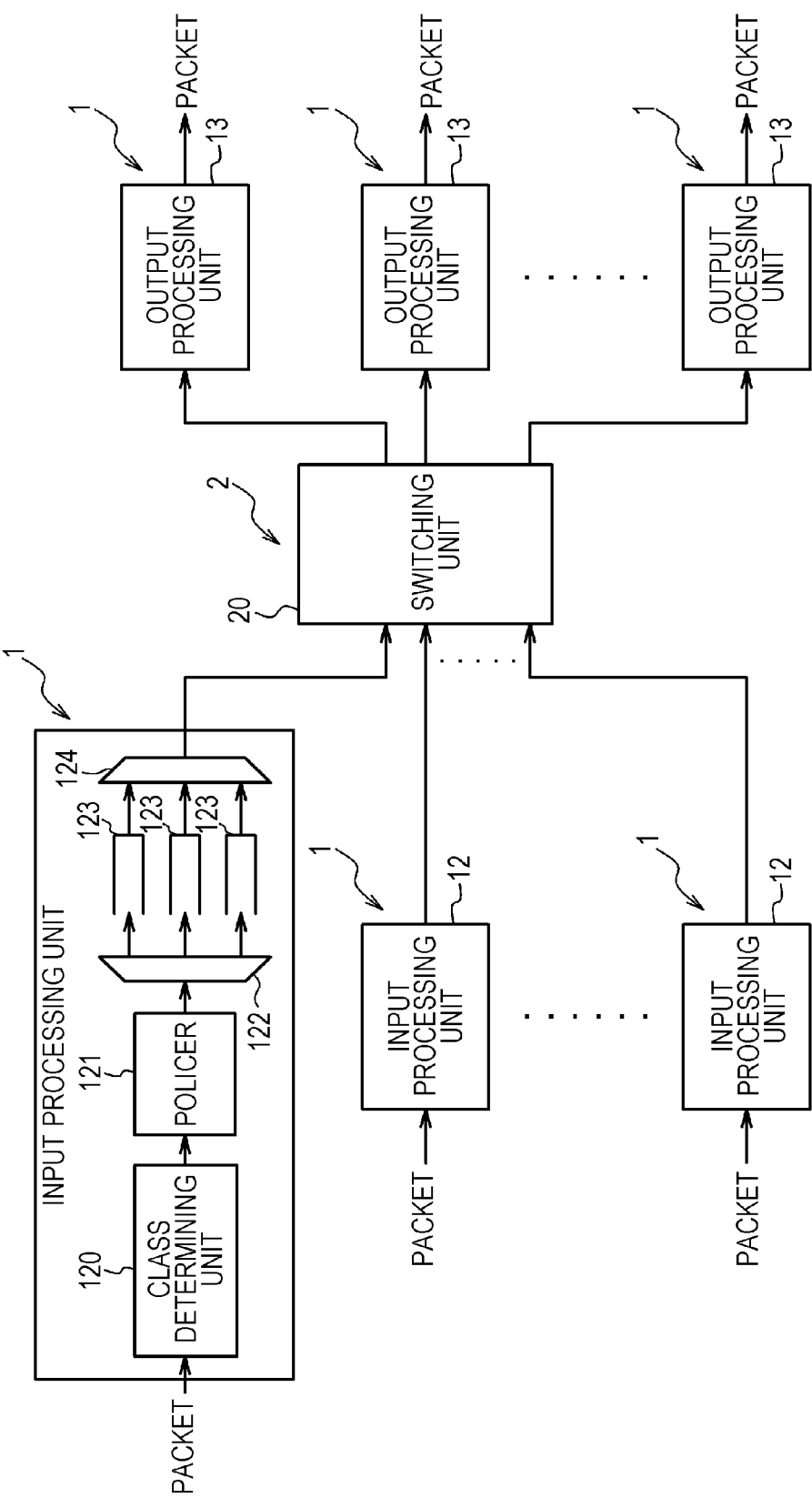
FIG. 3 illustrates packet paths in the transmission apparatus.

FIG. 3 illustrates packet paths in the transmission apparatus. FIG. 3 also illustrates the configuration of the input processing unit 12.

First, a packet is input to the input processing unit 12 in one network interface card 1. The input processing unit 12 includes a class determining unit 120, a policer 121, a distributing unit 122, input queues 123, and an output unit 124.

The class determining unit 120 determines a class of the quality of communication (the quality of service: QoS) for each packet and adds a flow identifier (ID) corresponding to the class to a packet, for example, by inserting the flow ID into an in-device header thereof. The class determining unit 120 determines the class based on, for example, a destination address (DA) included in a header in a packet or a virtual local area network (VLAN) ID.

In order to ensure that the amount of traffic of packets to be input does not exceed a predetermined bandwidth, the policer 121 discards packets that exceed the predetermined bandwidth. The distributing unit 122 distributes packets to the input queues 123 in accordance with the flow IDs of the packets. The input queues 123 accumulate the packets until they are read by the output unit 124. The output unit 124 selects one of the input queues 123 to read a packet from the selected input queue 123 and outputs the read packet to a switching unit 20 in the switch card 2. The switching unit 20 outputs the input packet to the output processing unit 13 in the network interface card 1 corresponding to the destination address of the packet.

Figure 4:
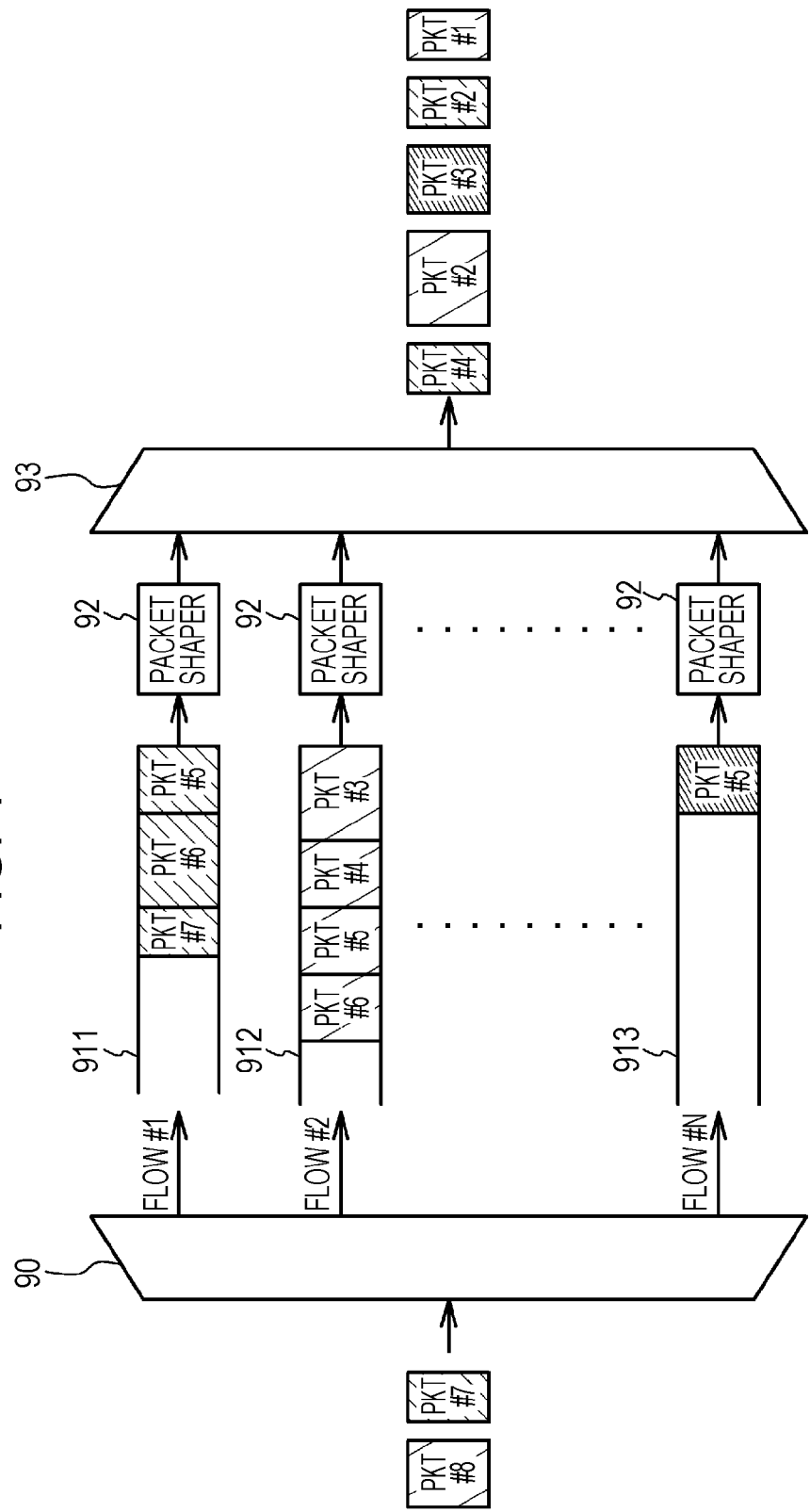
FIG. 4 is a block diagram illustrating a comparative example of the functional configuration of an output processing unit.

FIG. 4 is a block diagram illustrating a comparative example of the functional configuration of the output processing unit 13. The output processing unit 13 includes a distributing unit 90, queues 911 to 913, packet shapers 92, and a scheduler unit 93.

The distributing unit 90 distributes input packets (see "PKT" in FIG. 4) to the queues 911 to 913 in accordance with flow IDs. The distributing unit 90 stores, for example, packets PKT#5 to #7 in a flow #1 in the queue 911, stores packets PKT#3 to #6 in a flow #2 in the queue 912, and stores a packet PKT#5 in a flow #N in the queue 913 (N is a natural number greater than or equal to 3).

The queues 911 to 913 accumulate packets for the respective flow IDs. Each of the queues 911 to 913 is a packet storage, such as a first-in first-out (FIFO).

The packet shapers 92 adjust intervals of packets read from the corresponding queues 911 to 913. Each packet shaper 92 has, for example, a token bucket for storing tokens handled as the right to transmit packets and restricts packet reading in accordance with the remaining amount of tokens. Each packet shaper 92 adjusts the intervals of packets in accordance with a token supply rate.

The scheduler unit 93 consumes tokens to read packets from the queues 911 to 913 through the corresponding packet shapers 92. For example, in accordance with a round robin system, the scheduler unit 93 selects a reading-target queue from readable queue(s) of the queues 911 to 913. The read packets are transmitted to an external apparatus via a port.

Figure 5:
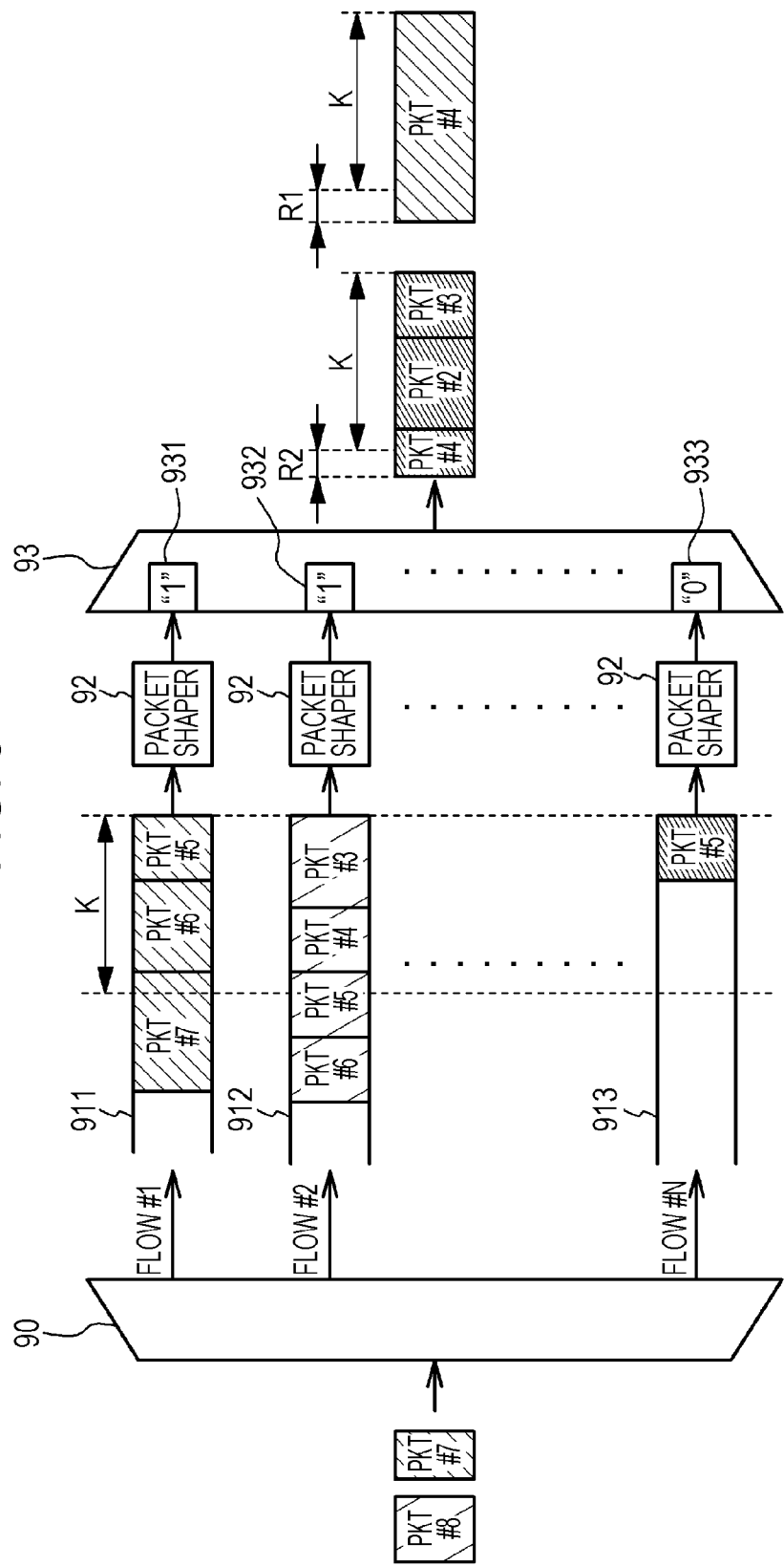
FIG. 5 illustrates an example of the reading processing performed by the output processing unit illustrated in FIG. 4.

As described above, when the read processing is performed for each packet, the time permitted for scheduling is restricted. Thus, the scheduler unit 93 continuously reads packets in a predetermined amount of data. FIG. 5 illustrates an example of the reading processing performed by the output processing unit 13 illustrated in FIG. 4.

The scheduler unit 93 has reading flags 931 to 933 that indicate whether or not packets are readable from the respective queues 911 to 913. Each of the reading flags 931 to 933 indicates "1" when any packet is readable and indicates "0" when no packet is readable.

For example, for the queues 911 and 912 in which the amounts of data in accumulated packets are larger than a predetermined amount K, the reading flags 931 and 932 are set to "1", and, for the queue 913 in which the amount of data in accumulated packets is smaller than the predetermined amount K, the reading flag 933 is set to "0". The scheduler unit 93 reads packets from, of the queues 911 to 913, the queues for which the corresponding reading flags 931 to 933 indicate "1".

This arrangement allows the scheduler unit 93 to read one or more packets as bursty traffic, so that the restriction on the time permitted for the scheduling is alleviated. In this example, however, since the amounts of data in packets that are read to exceed the predetermined amount K, that is, excess amounts R1 and R2, exist, the fairness among the bandwidths of the queues 911 to 913 is not guaranteed. Also, since the amounts of data accumulated in the queues 911 to 913 are not read until they exceed the predetermined amount K, the amount of delay of packets increases when short packets are input to the queues 911 to 913 at a low rate.

Accordingly, in order to overcome the foregoing problem, a scheme is conceivable in which the scheduling function is provided independently from the packet reading function and permissible reading amounts indicating the amounts of data of readable packets are equally given to the queues. Herein, the permissible reading amounts are referred to "credits".

Figure 6:
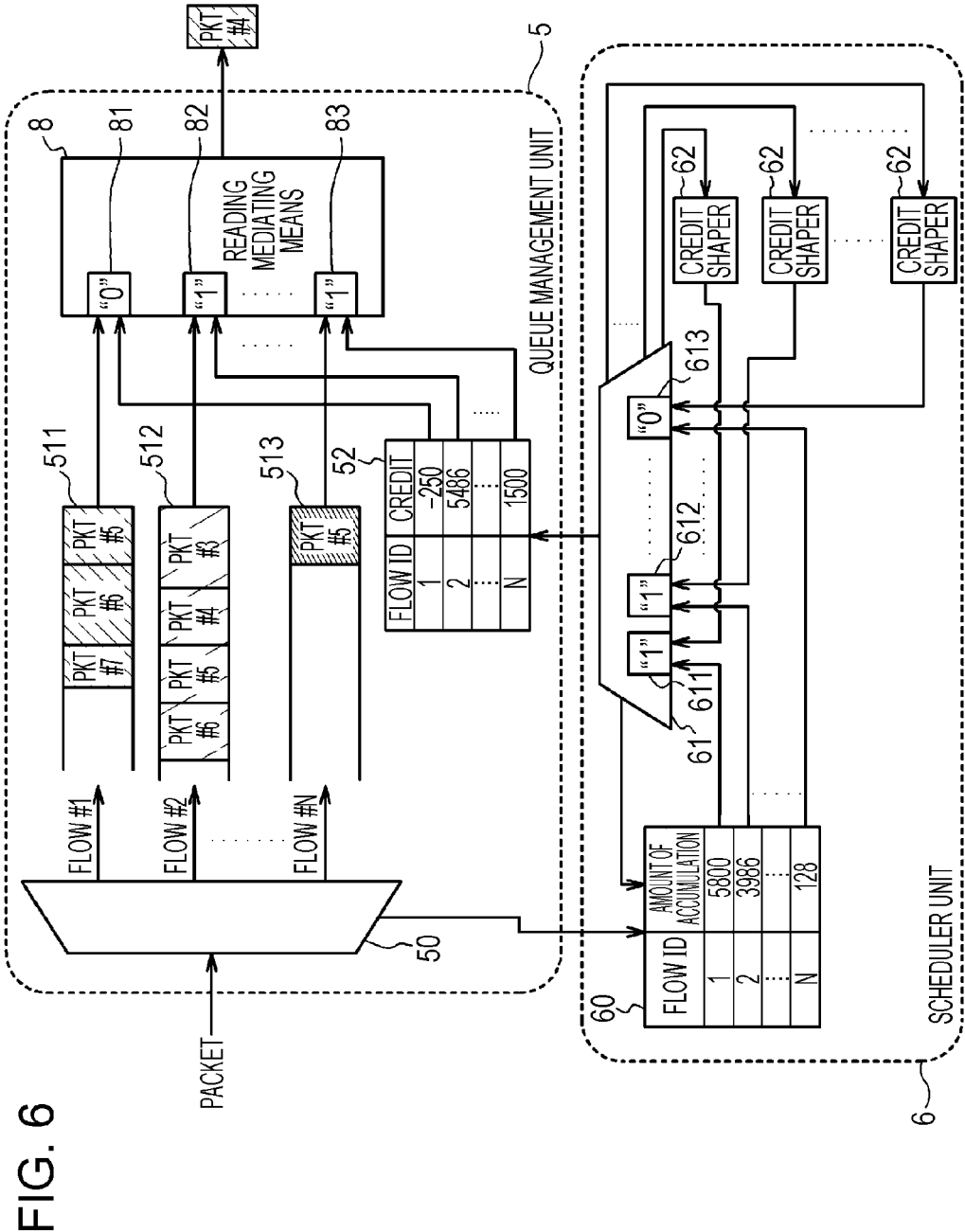
FIG. 6 is a block diagram illustrating another example of the functional configuration of the output processing unit.

FIG. 6 is a block diagram illustrating another example of the functional configuration of the output processing unit 13. The output processing unit 13 has a queue management unit 5 and a scheduler unit 6. The queue management unit 5 has a distributing unit 50, queues 511 to 513, a credit counter unit 52, and a reading mediating unit 8. The queue management unit 5 consumes credits to read packets from the queues 511 to 513. The scheduler unit 6 has an amount-of-accumulation counter unit 60, a credit issuing unit 61, and credit shapers 62. The scheduler unit 6 issues credits to the queue management unit 5.

The distributing unit 50 distributes input packets to the queues 511 to 513, based on flow IDs. The queues 511 to 513 each store one or more packets. The distributing unit 50 issues, to the scheduler unit 6, a notification indicating the flow ID and the packet length of an input packet.

Based on the notification from the distributing unit 50, the amount-of-accumulation counter unit 60 measures the amounts of data in packets for the respective flow IDs, that is, the amounts of data in packets accumulated in the respective queues 511 to 513. In the example in FIG. 6, data of 5800 bytes is accumulated in the queue 511 corresponding to a flow #1, data of 3986 bytes is accumulated in the queue 512 corresponding to a flow #2, and data of 128 bytes is accumulated in the queue 513 corresponding to a flow #N. In the description below, the amount of data measured by the amount-of-accumulation counter unit 60 is referred to as an "amount-of-accumulation counter".

The credit shapers 62 are provided for the respective flows #1 to #N to adjust intervals at which credits are to be given to the queues 511 to 513 for the flows #1 to #N. Each credit shaper 62 has, for example, a token bucket for storing tokens handled as the right to transmit packets and restricts credit issuance in accordance with the remaining amount of tokens. Each credit shaper 62 adjusts the intervals at which a credit is to be given, in accordance with a token supply rate.

The credit issuing unit 61 issues certain credits to the queue management unit 5. That is, the credit issuing unit 61 gives a certain credit to each of the queues 511 to 513. The credit issuing unit 61 has issuance flags 611 to 613 indicating whether or not credits are issuable to the respective queues 511 to 513.

Each of the issuance flags 611 to 613 indicates "1" when a credit is issuable and indicates "0" when no credit is issuable. Each of the issuance flags 611 to 613 is set to "1" when the amount-of-accumulation counter for the corresponding flow is larger than or equal to a predetermined amount B and the remaining amount of tokens in the corresponding credit shaper 62 is larger than 0.

In the example in FIG. 6, when the predetermined amount B is assumed to be 1500 bytes, the issuance flag 613 indicates "0" since the amount-of-accumulation counter (128 Bytes) for the flow #N is smaller than the predetermined amount B. Since the amount-of-accumulation counters for the other flows #1 and #2 are larger than the predetermined amount B, the issuance flags 611 and 612 indicate "1". Thus, credits are given to, of the queues 511 to 513, the queue in which the amount of data in accumulated packets is larger than or equal to the predetermined amount B, and the packets are read as traffic having certain burstiness, thereby making it possible to enhance the throughput.

Figure 7:
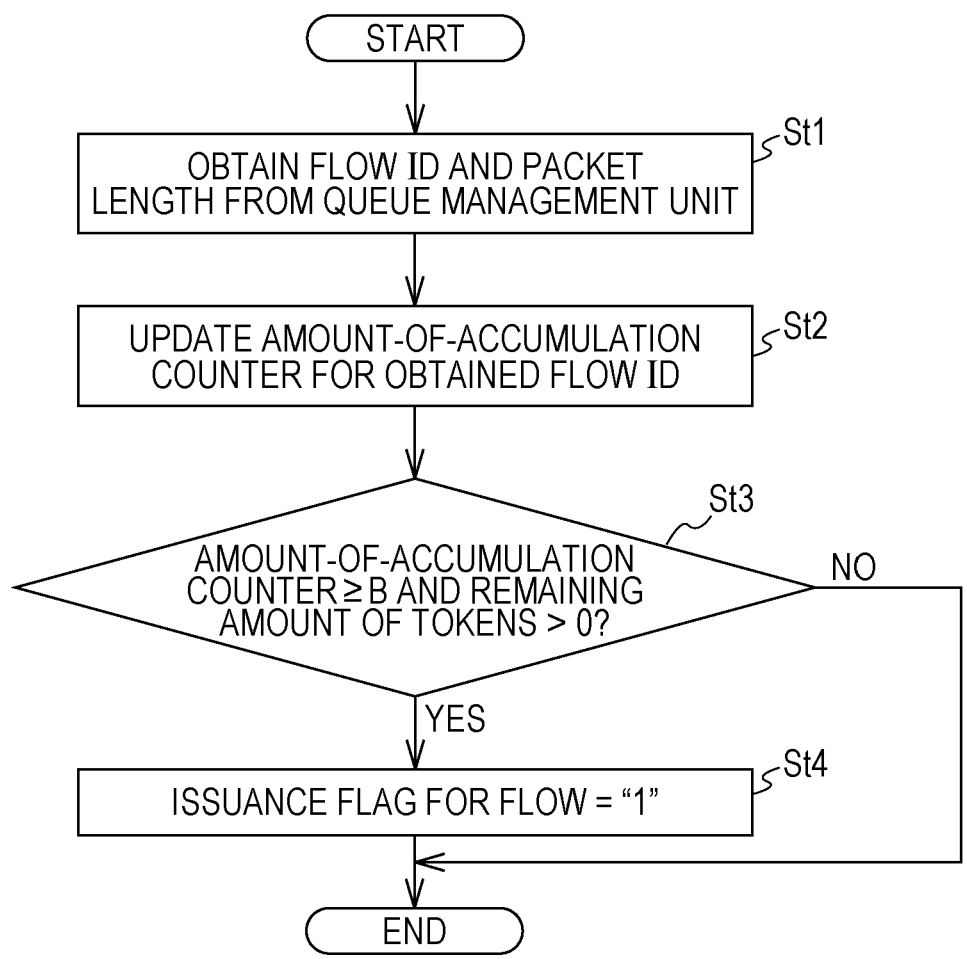
FIG. 7 is a flowchart illustrating an operation example of a scheduler unit when a packet is input.

FIG. 7 is a flowchart illustrating an operation example of the scheduler unit 6 when a packet is input. First, in step St1, the amount-of-accumulation counter unit 60 obtains a flow ID and a packet length from the queue management unit 5. Next, in step St2, based on the obtained flow ID and packet length, the amount-of-accumulation counter unit 60 updates the amount-of-accumulation counter for the corresponding one of the flows #1 to #N. Next, in step St3, the credit issuing unit 61 determines whether or not an issuance condition that the amount-of-accumulation counter for the corresponding one of the flows #1 to #N is larger than or equal to the predetermined amount B and the remaining amount of tokens in the corresponding credit shaper 62 is larger than 0 is satisfied.

When the issuance condition is satisfied (YES in step St3), the credit issuing unit 61 sets the issuance flag 611, 612, or 613 for the corresponding one of the flows #1 to #N to "1" (step St4) and then ends the processing. On the other hand, when the issuance condition is not satisfied (NO in step St3), the credit issuing unit 61 ends the processing. The scheduler unit 6 performs processing as described above, when a packet is input.

Figure 8:
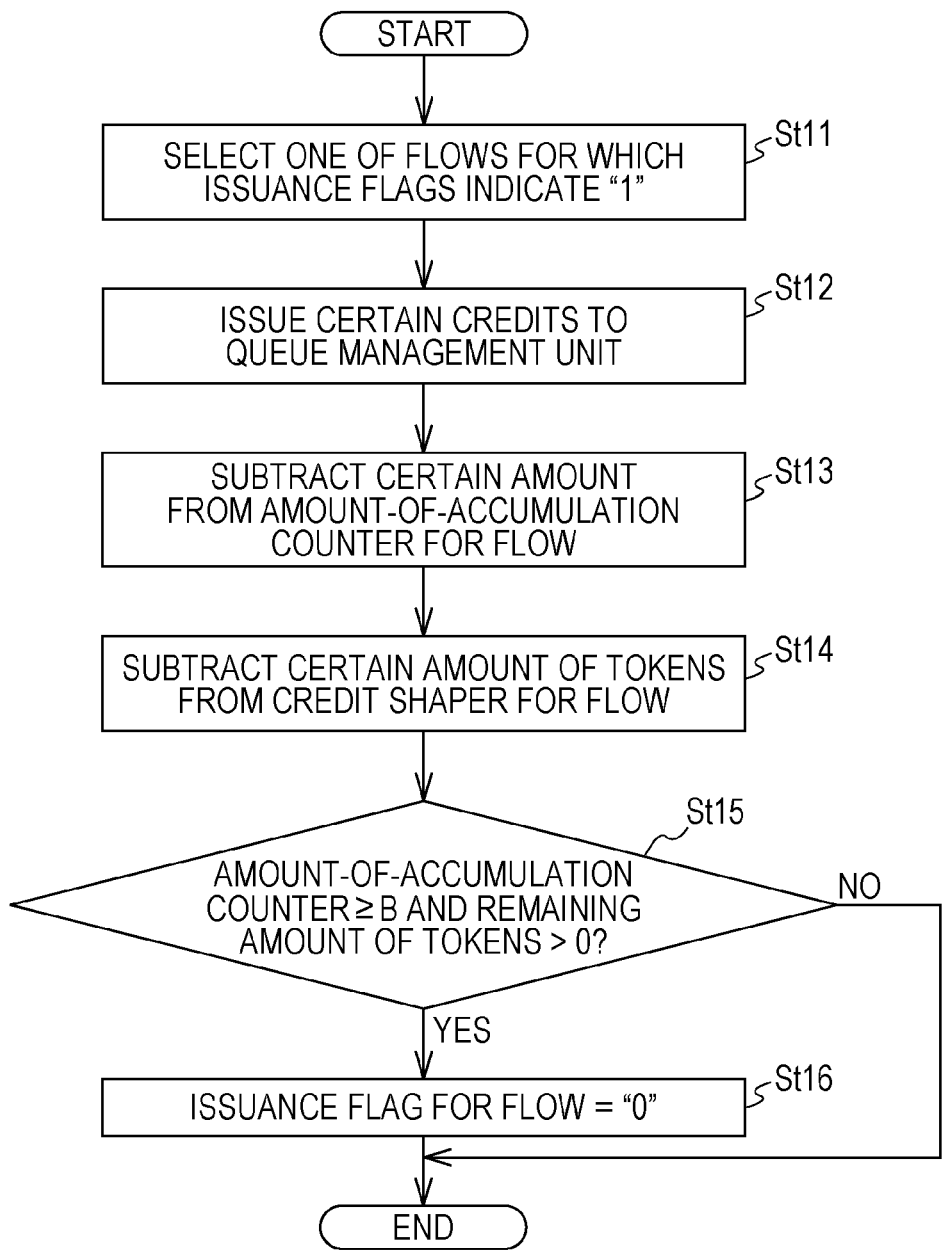
FIG. 8 is a flowchart illustrating an operation example of the scheduler unit when a credit is issued.

The credit issuing unit 61 issues certain credits to the queues 511 to 513 for the flows #1 to #N for which the issuance flags 611 to 613 indicate "1". FIG. 8 is a flowchart illustrating an operation example of the scheduler unit 6 when a credit is issued.

First, in step St11, the credit issuing unit 61 selects one of the flows #1 to #N for which the corresponding issuance flags 611 to 613 indicate "1". For example, the credit issuing unit 61 may select one of the flows #1 to #N, for example, by a round robin system.

Next, in step St12, the credit issuing unit 61 issues certain credits to the queue management unit 5. That is, the scheduler unit 6 gives certain credits to the queues 511 to 513. The credit counter unit 52 in the queue management unit 5 counts the issued credits.

The credit counter unit 52 counts the credits for the respective flow IDs, that is, for the respective queues 511 to 513. In the example in FIG. 6, the queue 511 for the flow #1 has a credit of −250 bytes, and the queue 512 for the flow #2 has a credit of 5486 bytes. The queue 513 for the flow #N has a credit of 1500 bytes. The scheduler unit 6 gives a certain amount of credit to each of the queues 511 to 513. In the description below, the amount of credit counted by the credit counter unit 52 is referred to as a "credit counter".

Next, in step St13, the credit issuing unit 61 subtracts a certain amount from the amount-of-accumulation counter for the corresponding one of the flows #1 to #N. That is, upon issuing a credit, the credit issuing unit 61 updates the amount-of-accumulation counter in the amount-of-accumulation counter unit 60, regarding that packets corresponding to the credit have been read.

Next, in step St14, the credit issuing unit 61 subtracts a certain amount of tokens from tokens in the credit shaper 62 for the corresponding one of the flows #1 to #N. That is, the credit issuing unit 61 consumes a token to issue a credit.

Next, in step St15, the credit issuing unit 61 determines whether or not the issuance condition that the amount-of-accumulation counter for the corresponding one of the flows #1 to #N is larger than or equal to the predetermined amount B and the remaining amount of tokens in the corresponding credit shaper 62 is larger than 0 is satisfied.

When the issuance condition is not satisfied (NO in step St15), the credit issuing unit 61 sets the issuance flag 611, 612, or 613 for the corresponding one of the flows #1 to #N to "0" (step St16), and ends the processing. On the other hand, when the issuance condition is satisfied (YES in step St15), the credit issuing unit 61 ends the processing. The scheduler unit 6 performs the credit issuing processing in the manner described above.

On the other hand, the reading mediating unit 8 in the queue management unit 5 consumes credits to read packets from the respective queues 511 to 513. The reading mediating unit 8 has reading flags 81 to 83 for the respective flows #1 to #N. When a reading condition regarding the credits for the corresponding queue 511, 512, or 513 and the amount of data in packets accumulated in the corresponding queue 511, 512, or 513 is satisfied, the corresponding reading flag 81, 82, or 83 indicates "1". When the reading condition is not satisfied, the corresponding reading flag 81, 82, or 83 indicates "0".

The reading condition is satisfied when both of the credit for the corresponding queue 511, 512, or 513 and the amount of data in packets accumulated in the corresponding queue 511, 512, or 513 are larger than 0. That is, when a packet is stored in the queue 511, 512, or 513 and the corresponding credit counter has a positive value, the reading mediating unit 8 reads packets from the corresponding queue 511, 512, or 513.

In the example in FIG. 6, since packets are stored in the queues 511 to 513 and the credit counter for the flow #1 is −250, the reading flag 81 is set to "0". Since the credit counters for the flows #2 and #N have positive values, the reading flags 82 and 83 are set to "1". According to the reading condition, when at least a credit of 1 byte and at least one packet exist, this packet is read from a corresponding one of the queues 511 to 513, regardless of the packet length. Thus, the waiting time of the packet is reduced and the throughput is enhanced.

In this example, the scheduler unit 6 is provided separately and independently from the queue management unit 5, which reads packets from the queues 511 to 513. Regardless of the lengths of the individual packets accumulated in the queues 511 to 513, the scheduler unit 6 issues certain credits (that is, certain permissible reading amounts) to the flows #1 to #N, that is, the queues 511 to 513. Each credit is consumed according to the amount of data in read packets and may have a negative value. Thus, the amounts of packets read from the queues 511 to 513 are controlled based on the credits, so that the fairness among the queues 511 to 513 is guaranteed.

In this example, even when the amount of data in packets accumulated in each of the queues 511 to 513 is not larger than or equal to the certain amount K, packets are read as long as there is a credit of at least 1 byte, unlike the case in the comparative example illustrated in FIG. 5. For example, in FIG. 6, since the amount-of-accumulation counter for the flow #N is 128 bytes, the scheduler unit 6 does not issue any credit to the queue 513 for the flow #N, as described above. However, since the queue 513 for the flow #N has a credit of 1500 bytes, a packet PKT#5 stored in the queue 513 is read. Thus, when a certain credit is given to each of the queues 511 to 513 as an initial value, even if short packets continue, it is possible to read the packets with a small amount of delay by consuming the credit.

As described above, the reading mediating unit 8 reads packets from the queues 511 to 513 for the corresponding flows #1 to #N for which the reading flags 81 to 83 indicate "1". When the plurality of reading flags 81 to 83 indicate "1", the reading mediating unit 8 selects, of the queues 511 to 513, the queue from which a packet is to be read. Thus, the reading mediating unit 8 mediates reading contention among the queues 511 to 513. In the technology disclosed in U.S. Pat. No. 7,990,858, such mediation is not performed, since each input controller has an individual packet buffer (queue) and can read packets at a rate that is the same as the bandwidth of an output controller.

If a new scheduler is provided as the reading mediating unit 8, the significance of the separately provided scheduler unit 6 is lost. In accordance with a predetermined scheduling algorithm, a scheduler performs search processing based on parameters, such as priority and weighting, for each flow in order to select one of the queues from which a packet is readable. In the search processing, a larger amount of time is involved, as the number of patterns of readable queues increases, and when the number of queues is large and when an algorithm is complicated, a larger amount of time is involved. Thus, it is desired that the reading mediating unit 8 involve no or small amount of load in the search processing.

First Embodiment

Figure 9:
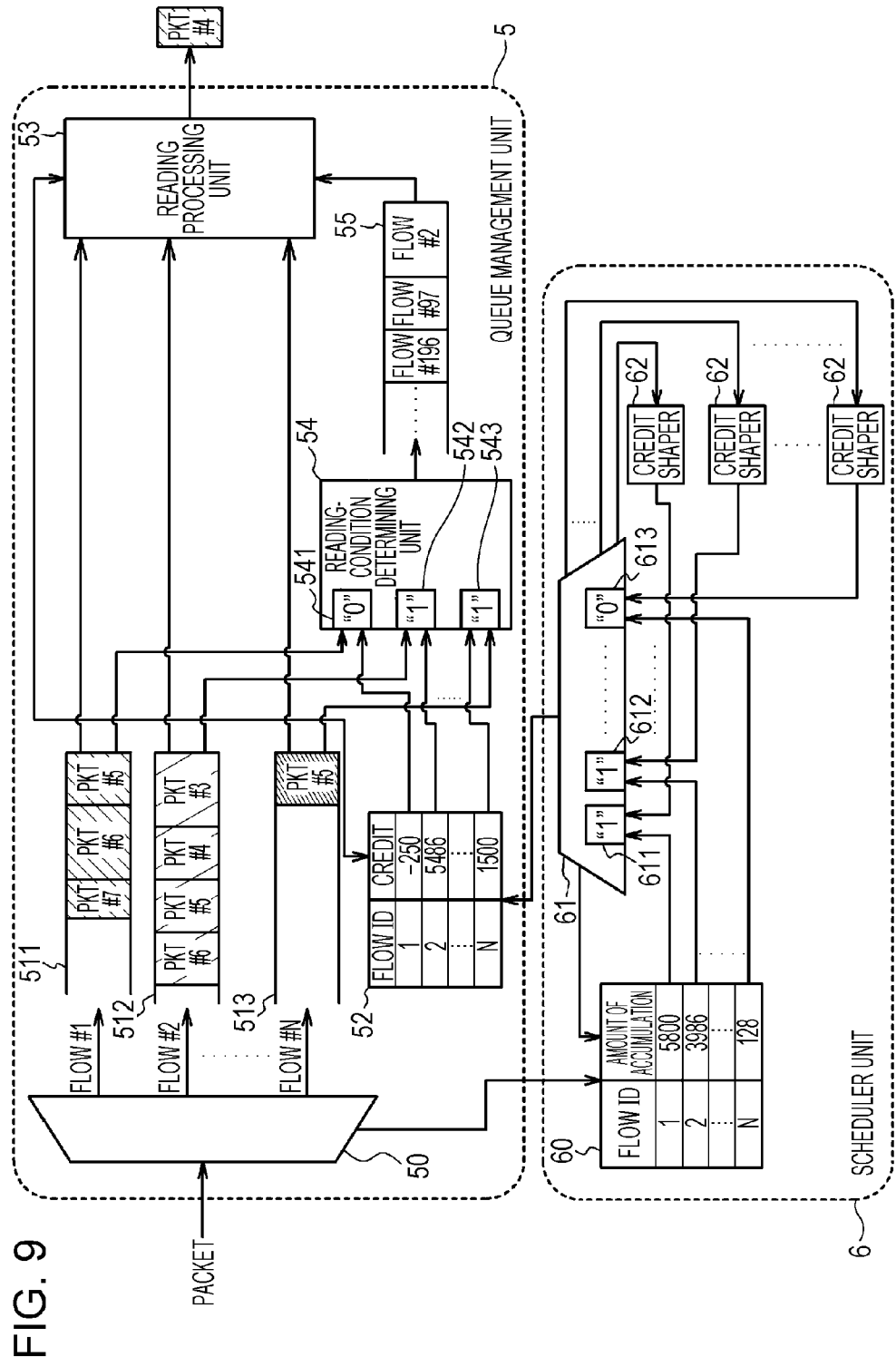
FIG. 9 is a block diagram illustrating the functional configuration of an output processing unit in a first embodiment.

Accordingly, without using the above-described search processing, the network interface card 1 according to an embodiment employs a scheme in which the queues 511 to 513 notify the reading mediating unit 8 that they are in a readable state. FIG. 9 is a block diagram illustrating the functional configuration of an output processing unit 13 in a first embodiment. In FIG. 9, elements that are the same as or similar to those in FIG. 6 are denoted by the same reference numerals, and descriptions thereof are not given hereinafter.

The output processing unit 13 has a queue management unit 5 and a scheduler unit 6. The queue management unit 5 has a distributing unit 50, queues 511 to 513, a credit counter unit 52, a reading processing unit 53, a reading-condition determining unit 54, and a reading-order registration FIFO 55. The scheduler unit 6 has an amount-of-accumulation counter unit 60, a credit issuing unit 61, and credit shapers 62. The scheduler unit 6 operates as described above with reference to FIG. 6.

The reading-condition determining unit 54 determines whether or not each of the queues 511 to 513 satisfies the reading condition and registers, in the reading-order registration FIFO 55, the flow ID(s) of the queues 511 to 513 which satisfies (satisfy) the reading condition. The reading-condition determining unit 54 has reading flags 541 to 543 for the respective queues 511 to 513. The contents of the reading flags 541 to 543 are the same as those of the reading flags 81 to 83 described above with reference to FIG. 6, and the reading condition is also the same as that described above.

The reading-condition determining unit 54 registers the flow IDs of the queues 511 to 513 in the reading-order registration FIFO 55 in the order in which the reading condition is satisfied. The reading processing unit 53 reads the flow IDs from the reading-order registration FIFO 55 and consumes credits to read packets from the queues 511 to 513 for the flows. In this case, the reading processing unit 53 reads the first flow ID, that is, the earliest registered flow ID, of the flow IDs registered in the reading-order registration FIFO 55.

That is, by consuming a credit, the reading processing unit 53 reads, from the queues 511 to 513, packets in the order in which the reading condition regarding the credit for each queue and the amount of data in packets accumulated in each queue is satisfied. In the example in FIG. 9, packets are read from the queues 511 to 513 in the order: a flow #2, a flow #97, and a flow #196. Thus, without performing complicated search processing, the reading processing unit 53 easily determines a reading-target queue in accordance with the flow IDs registered in the reading-order registration FIFO 55, thereby making it possible to perform reading processing in a short period of time.

When a packet is read from any of the queues 511 to 513 which corresponds to the flow ID and then the queue from which the packet is read further satisfies the reading condition, the reading-condition determining unit 54 re-registers the flow ID in the reading-order registration FIFO 55. The flow-ID registration processing is triggered by an event that satisfies the reading condition. The event refers to storing packets to the queues 511 to 513, issuing credits from the scheduler unit 6, or reading packets from the queues 511 to 513. Next, a description will be given of operation of the queue management unit 5 in each event.

Figure 10:
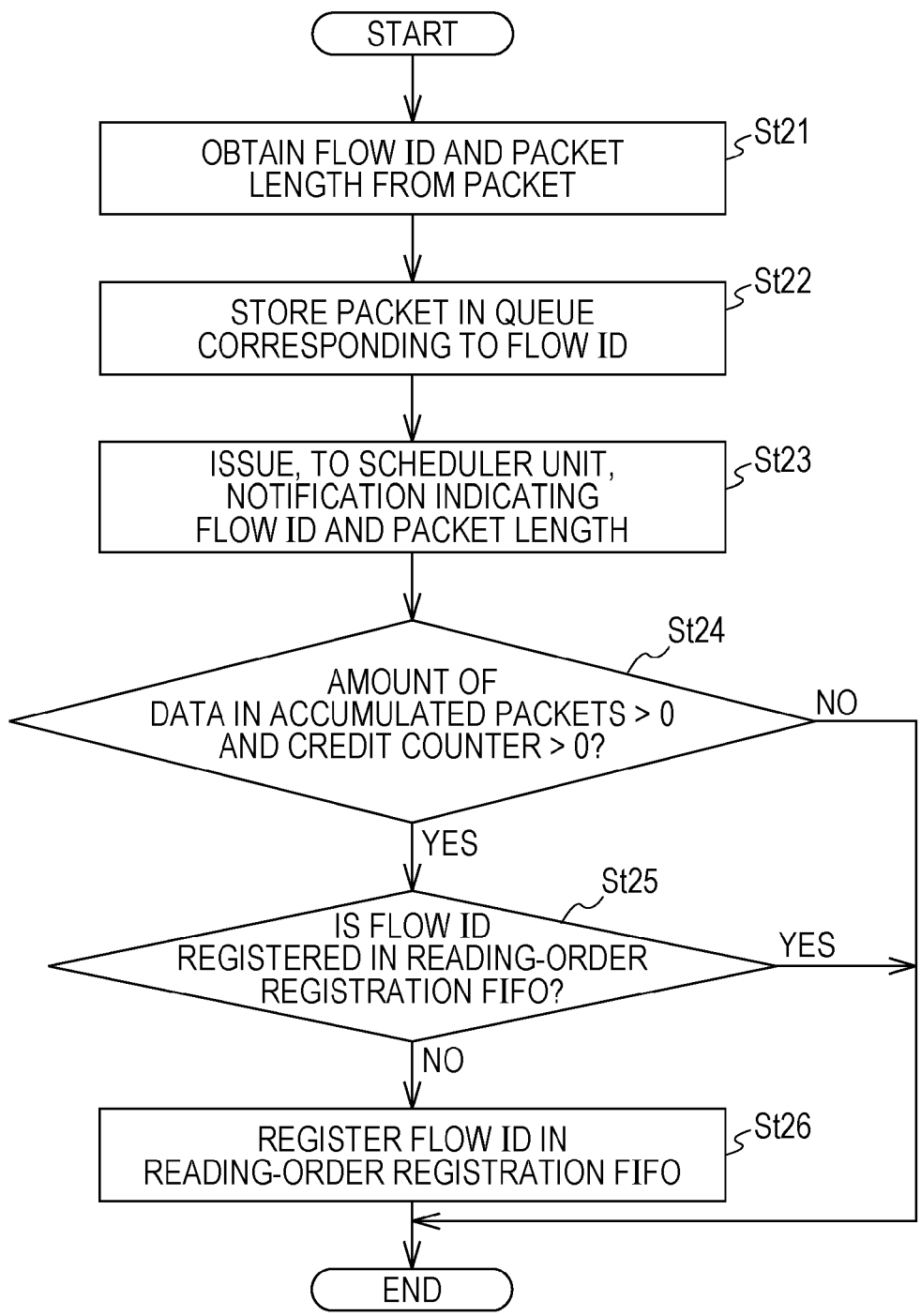
FIG. 10 is a flowchart illustrating an operation example of a queue management unit when a packet is stored in a queue.

FIG. 10 is a flowchart illustrating an operation example of the queue management unit 5 when a packet is stored in any of the queues 511 to 513. First, in step St21, the distributing unit 50 obtains a flow ID and a packet length from a packet input from the switch card 2.

Next, in step St22, the distributing unit 50 stores the packet in one of the queues 511 to 513 which corresponds to the obtained flow ID. In step St23, the distributing unit 50 issues, to the scheduler unit 6, a notification indicating the obtained flow ID and packet length. In step St24, the reading-condition determining unit 54 determines whether or not the reading condition that the amount of data in packets accumulated in the queue 511, 512, or 513 corresponding to the flow ID is larger than 0 and the credit counter for the flow ID is larger than 0 is satisfied.

When the reading condition is not satisfied (NO in step St24), the queue management unit 5 ends the processing. On the other hand, when the reading condition is satisfied (YES in step St24), the process proceeds to step St25 in which the reading-condition determining unit 54 determines whether or not the flow ID is registered in the reading-order registration FIFO 55. When the flow ID is registered (YES in step St25), the queue management unit 5 ends the processing.

On the other hand, when the flow ID is not registered (NO in step St25), the reading-condition determining unit 54 registers the flow ID in the reading-order registration FIFO 55 in step St26, and the queue management unit 5 ends the processing. The queue management unit 5 performs processing as described above, when a packet is input.

Figure 11:
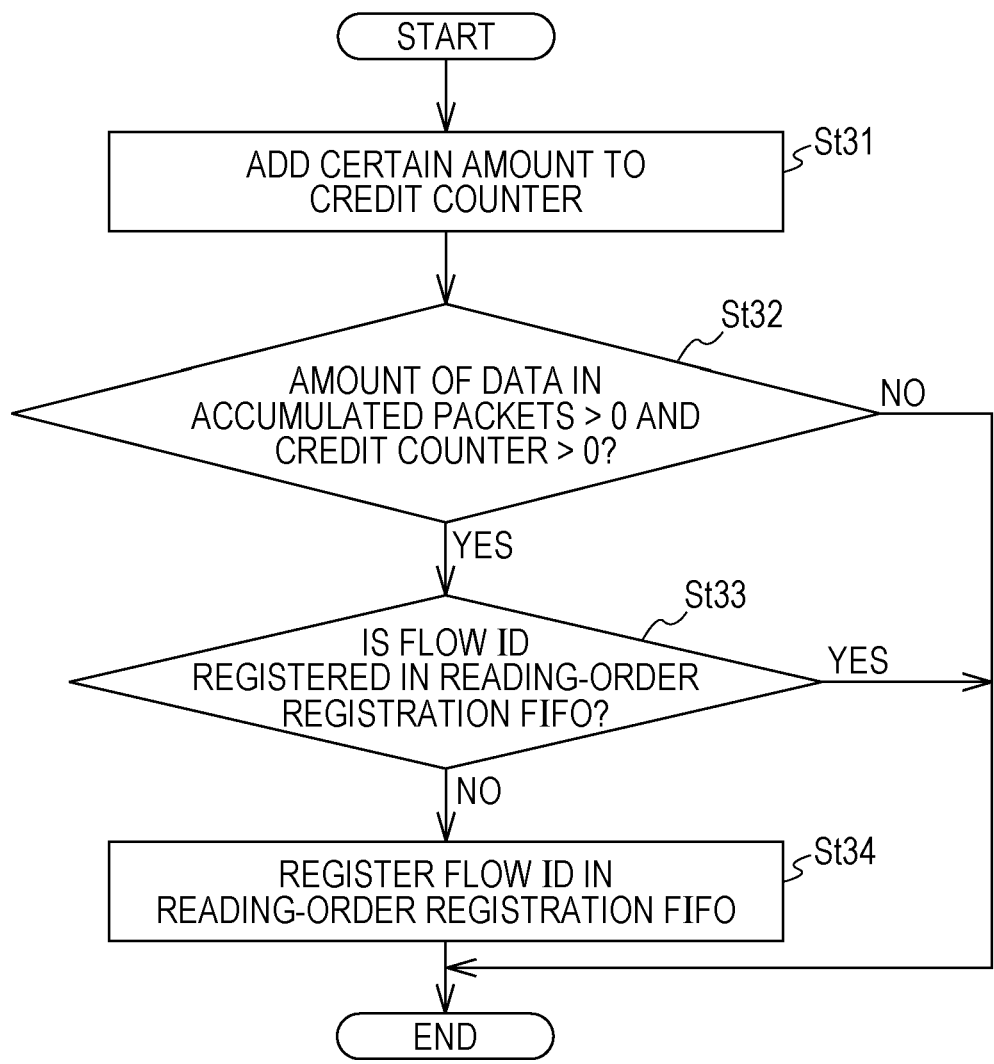
FIG. 11 is a flowchart illustrating an operation example of the queue management unit when a credit is issued.

FIG. 11 is a flowchart illustrating an operation example of the queue management unit 5 when a credit is issued. First, in step St31, the credit counter unit 52 adds a certain amount of credit, issued by the scheduler unit 6, to the credit counter for a corresponding flow ID.

Next, in step St32, the reading-condition determining unit 54 determines whether or not the reading condition that the amount of data in packets accumulated in the queue 511, 512, or 513 corresponding to the flow ID is larger than 0 and the credit counter for the flow ID is larger than 0 is satisfied. When the reading condition is not satisfied (NO in step St32), the queue management unit 5 ends the processing.

On the other hand, when the reading condition is satisfied (YES in step St32), the process proceeds to step St33 in which the reading-condition determining unit 54 determines whether or not the flow ID is registered in the reading-order registration FIFO 55. When the flow ID is registered (YES in step St33), the queue management unit 5 ends the processing.

On the other hand, when the flow ID is not registered (NO in step St33), the reading-condition determining unit 54 registers the flow ID in the reading-order registration FIFO 55 in step St34, and the queue management unit 5 ends the processing. The queue management unit 5 performs processing as described above, when a credit is issued.

Figure 12:
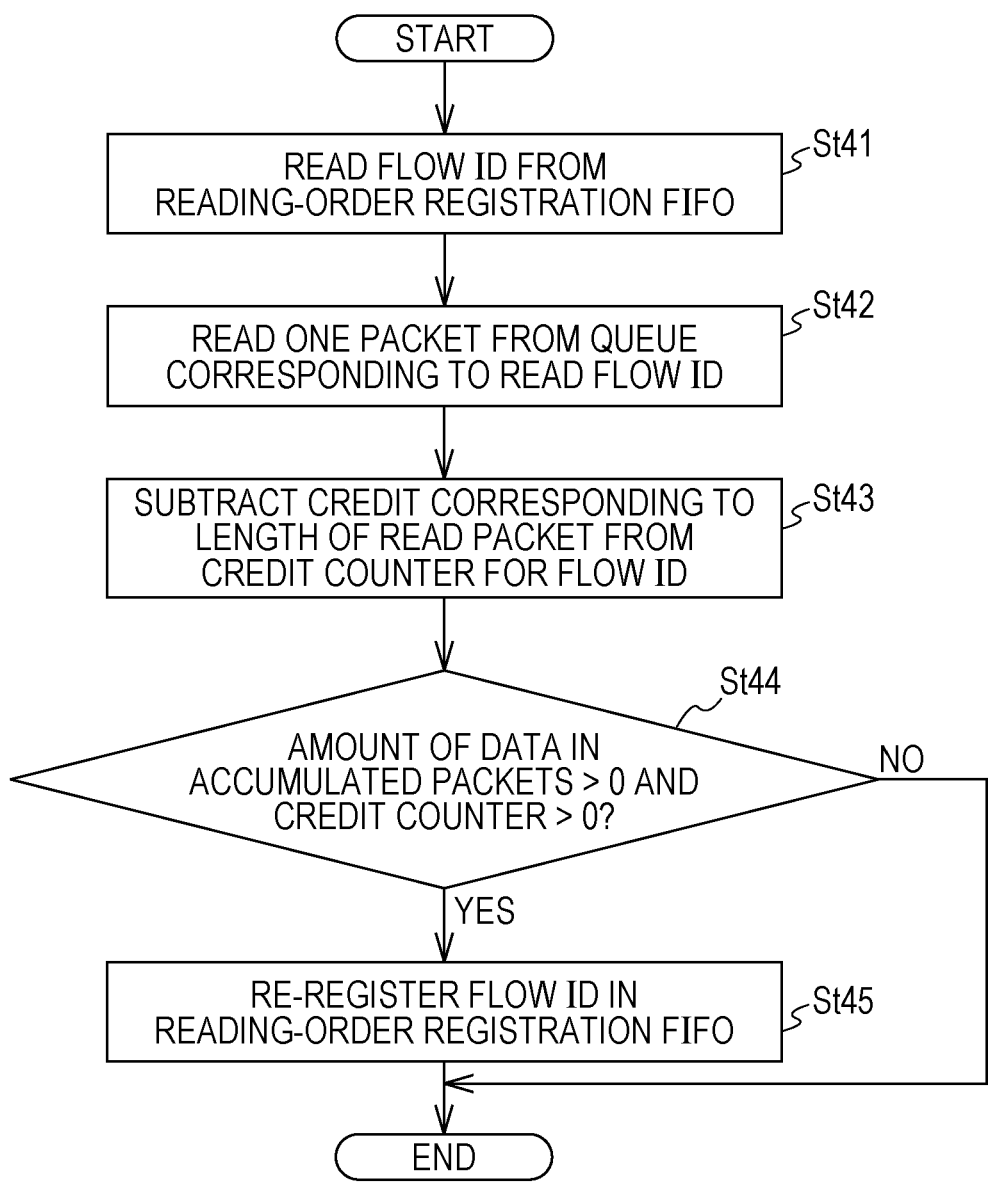
FIG. 12 is a flowchart illustrating an operation example of the queue management unit when a packet is read.

FIG. 12 is a flowchart illustrating an operation example of the queue management unit 5 when a packet is read. First, in step St41, the reading processing unit 53 reads a first flow ID from the reading-order registration FIFO 55. The read flow ID is deleted from the reading-order registration FIFO 55.

Next, in step St42, the reading processing unit 53 reads one packet from the queue 511, 512, or 513 corresponding to the read flow ID. In step St43, the reading processing unit 53 subtracts a credit corresponding to the length of the read packet from the credit counter for the flow ID. That is, by consuming a credit, the reading processing unit 53 reads packets from the queues 511 to 513 in the order in which the reading condition regarding a credit for each queue and the amount of data in packets accumulated in each queue is satisfied.

In step St44, the reading-condition determining unit 54 determines whether or not the reading condition that the amount of data in packets accumulated in the queue 511, 512, or 513 corresponding to the flow ID is larger than 0 and the credit counter for the flow ID is larger than 0 is satisfied. When the reading condition is not satisfied (NO in step St44), the queue management unit 5 ends the processing.

On the other hand, when the reading condition is satisfied (YES in step St44), the reading-condition determining unit 54 re-registers the flow ID in the reading-order registration FIFO 55 in step St45, and the queue management unit 5 ends the processing. The queue management unit 5 performs processing as described above, when a packet is read.

Figure 13:
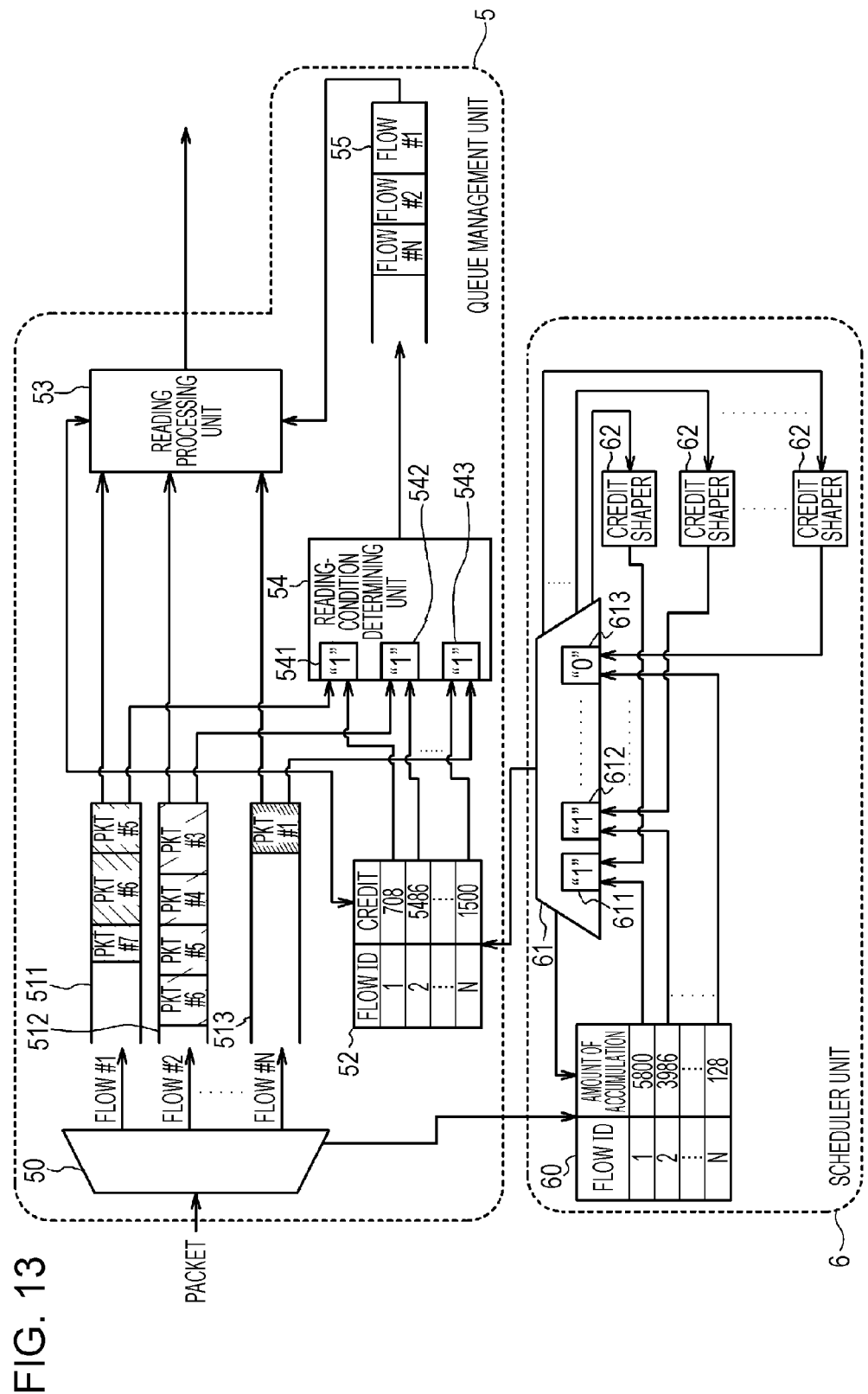
FIG. 13 illustrates an example of a state before the queue management unit reads packets.
Figure 14:
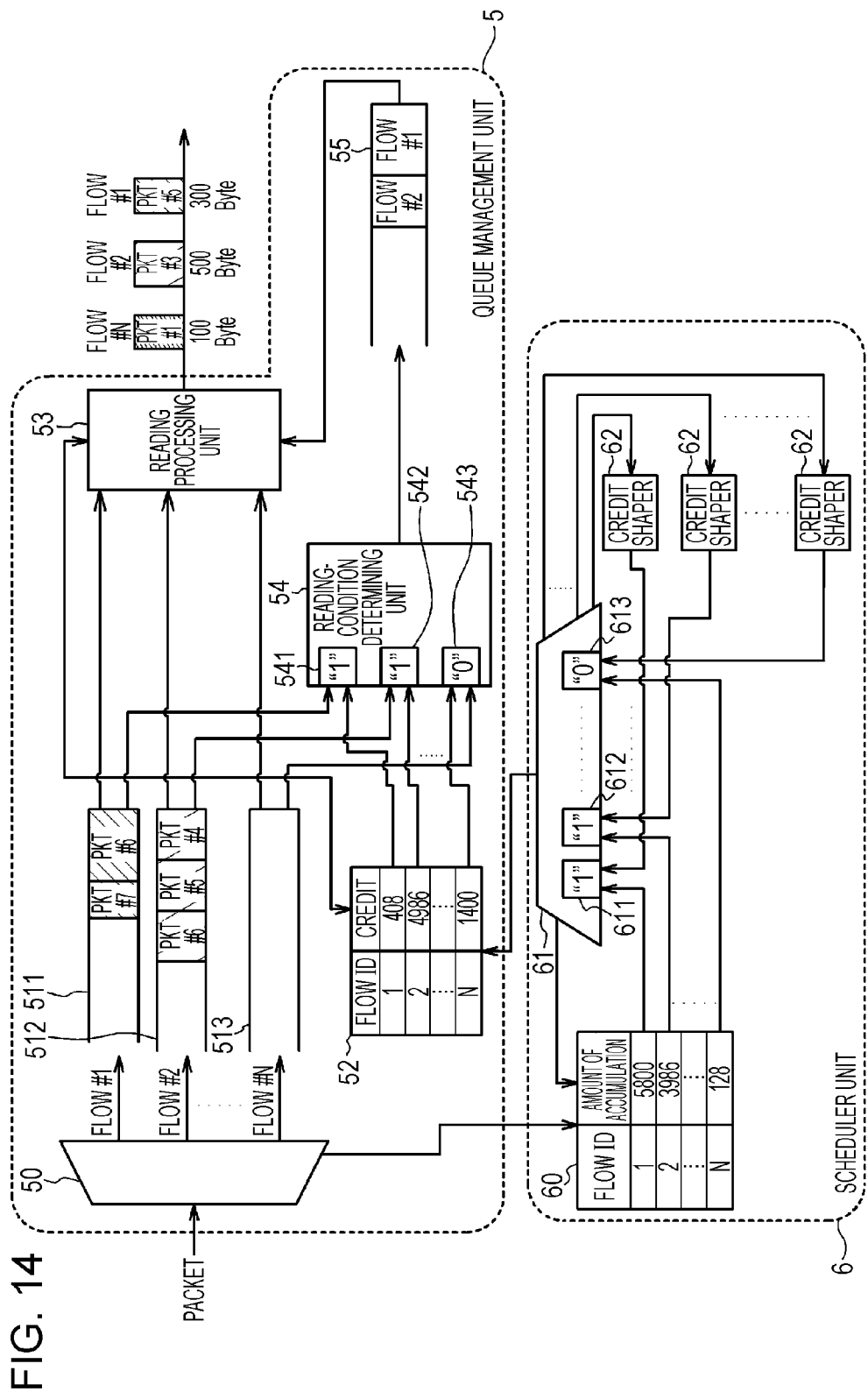
FIG. 14 illustrate an example of a state after the queue management unit reads the packets.

A specific example of the packet reading operation will now be described with reference to FIGS. 13 and 14. FIG. 13 illustrates an example of a state before the queue management unit 5 reads packets. FIG. 14 illustrates an example of a state after the queue management unit 5 reads the packets.

Before the reading, flow IDs are registered in the reading-order registration FIFO 55 in the order: a flow #1, a flow #2, and a flow #N. The credit counter for the flow #1 is 708 bytes, the credit counter for the flow #2 is 5486 bytes, and the credit counter for the flow #N is 1500 bytes.

In accordance with the order of the flow IDs registered in the reading-order registration FIFO 55, the reading processing unit 53 reads PKT#5 from the queue 511 for the flow #1, then reads PKT#3 from the queue 512 for the flow #2, and lastly reads PKT#1 from the queue 513 for the flow #N. As a result, a credit corresponding to 300 bytes that is the length of the read PKT#5 is subtracted from the credit counter for the flow #1, so that the credit counter becomes 408 bytes.

A credit corresponding to 500 bytes that is the length of the read PKT#3 is subtracted from the credit counter for the flow #2, so that the credit counter becomes 4986 bytes. A credit corresponding to 100 bytes that is the length of the read PKT#N is subtracted from the credit counter for the flow #N, so that the credit counter becomes 1400 bytes.

After the packets are read, since the credit counter is larger than 0 and the amount of data in the packets is larger than 0 with respect to each of the flows #1 and #2, each of the queues 511 and 512 satisfies the reading condition. Thus, the reading-condition determining unit 54 re-registers the flows #1 and #2 in the reading-order registration FIFO 55. Since no packet is accumulated in the queue 513 corresponding to the flow #N, the reading condition is not satisfied and the re-registration is not performed.

As described above, the reading processing unit 53 reads packets one by one from any of the queues 511 to 513 which satisfies the reading condition. Thus, the frequency of the reading processing becomes relatively high, but the traffic burstiness is reduced. This reduces the traffic load in the functional block at the subsequent stage or in an external apparatus to which the packets are to be transmitted.

As described above, the reading-condition determining unit 54 also registers a flow ID in the reading-order registration FIFO 55 during occurrence of the event of packet storage, the event of credit issuance, or the event of packet reading. Since those events do not occur at the same time, the reading-condition determining unit 54 does not mediate contention for registering flow IDs.

The reason is that, first, since packets are sequentially input from the switch card 2 to the output processing unit 13 one by one, multiple events of packet storage do not occur at the same time. Since the credit issuance and the packet reading are sequentially performed for each flow, those events do not occur at the same time. Simultaneous occurrence of different events is avoided, for example, by adjusting clock timings that synchronize with the processes of the events so that the timings at which the events occur are displaced from each other.

In the present embodiment, upon occurrence of the above-described event, the reading-condition determining unit 54 registers corresponding flow IDs in the reading-order registration FIFO 55 in the order in which the reading condition is satisfied. The reading processing unit 53 then refers to registered flow IDs in order starting from the first flow ID to read packets from the corresponding queues 511 to 513. As a result, without performing search processing that involves a large amount of time, the reading processing unit 53 can select the queues 511 to 513 by simple low-load processing to read packets therefrom.

As described above, the queue management unit 5 reads packets by a simple scheme, and the scheduler unit 6 uses the credit shapers 62 to consider parameters, such as priority and weighting, for each flow, thereby fairly issuing credits to the flows. Accordingly, the quality of communication in the entire network interface card 1 is guaranteed.

Second Embodiment

In the first embodiment, although the reading processing unit 53 reads packets one by one from any of the queues 511 to 513 which satisfies the reading condition, but the present technology is not limited thereto. For example, the reading processing unit 53 may sequentially read packets until the amount of data in the read packets reaches a predetermined amount.

Figure 15:
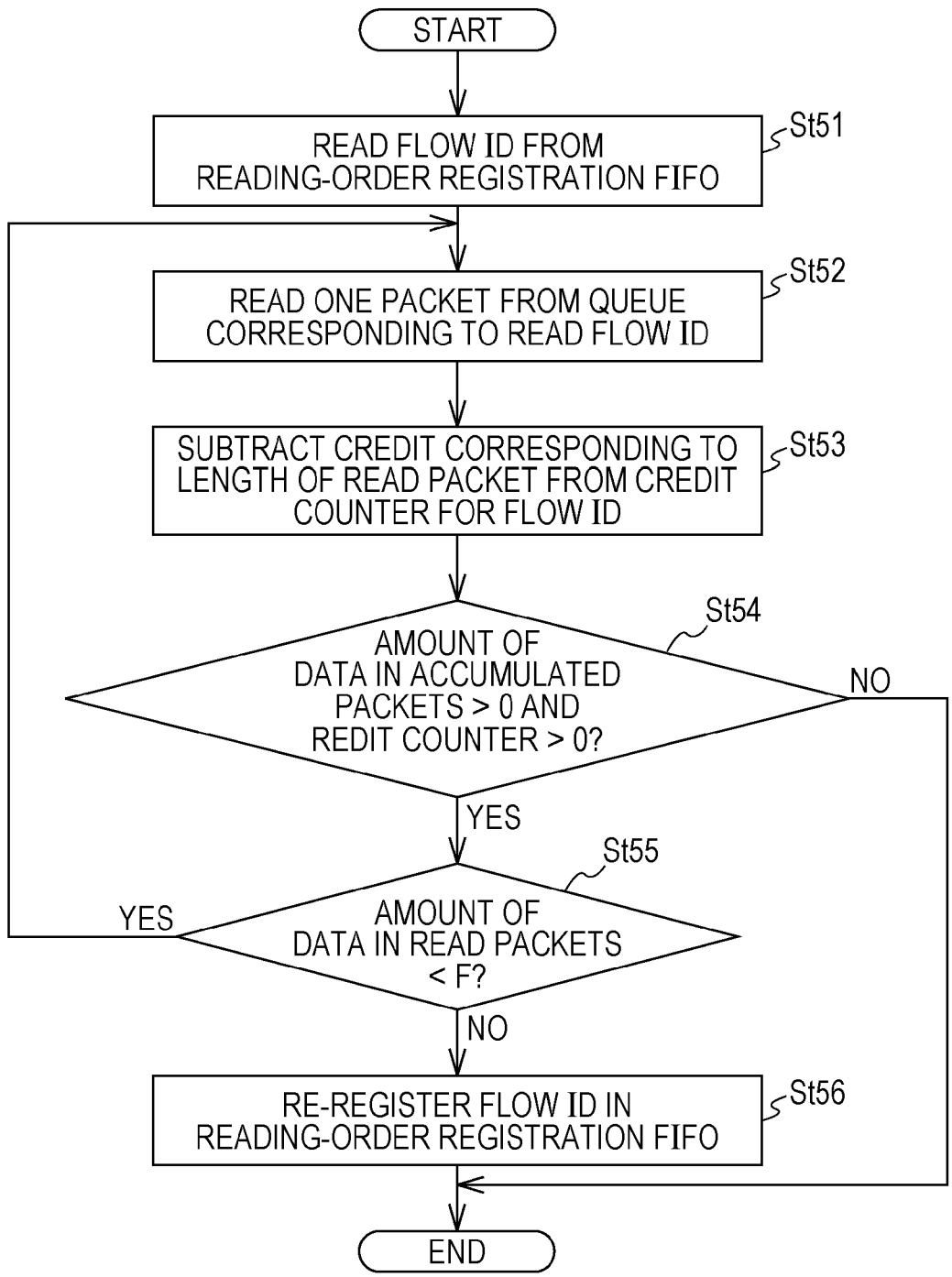
FIG. 15 is a flowchart illustrating an operation of the queue management unit in the second embodiment when a packet is read.

FIG. 15 is a flowchart illustrating an operation of the queue management unit 5 in the second embodiment when a packet is read. First, in step St51, the reading processing unit 53 reads a first flow ID from the reading-order registration FIFO 55.

Next, in step St52, the reading processing unit 53 reads one packet from the queue 511, 512, or 513 corresponding to the read flow ID. In step St53, the reading processing unit 53 subtracts a credit corresponding to the length of the read packet from the credit counter for the flow ID.

In step St54, the reading-condition determining unit 54 determines whether or not the reading condition that the amount of data in packets accumulated in the queue 511, 512, or 513 corresponding to the flow ID is larger than 0 and the credit counter for the flow ID is larger than 0 is satisfied. When the reading condition is not satisfied (NO in step St54), the queue management unit 5 ends the processing.

On the other hand, when the reading condition is satisfied (YES in step St54), the process proceeds to step St55 in which the reading processing unit 53 determines whether or not the amount of data in read packets is smaller than a predetermined amount F. When the amount of data in read packets is smaller than the predetermined amount F (YES in step St55), the process in step St52 is performed again.

On the other hand, when the amount of read data is larger than or equal to the predetermined amount F (NO in step St55), the reading-condition determining unit 54 re-registers the flow ID in the reading-order registration FIFO 55 in step St56, and the queue management unit 5 ends the processing. The queue management unit 5 performs processing as described above, when a packet is read.

Figure 16:
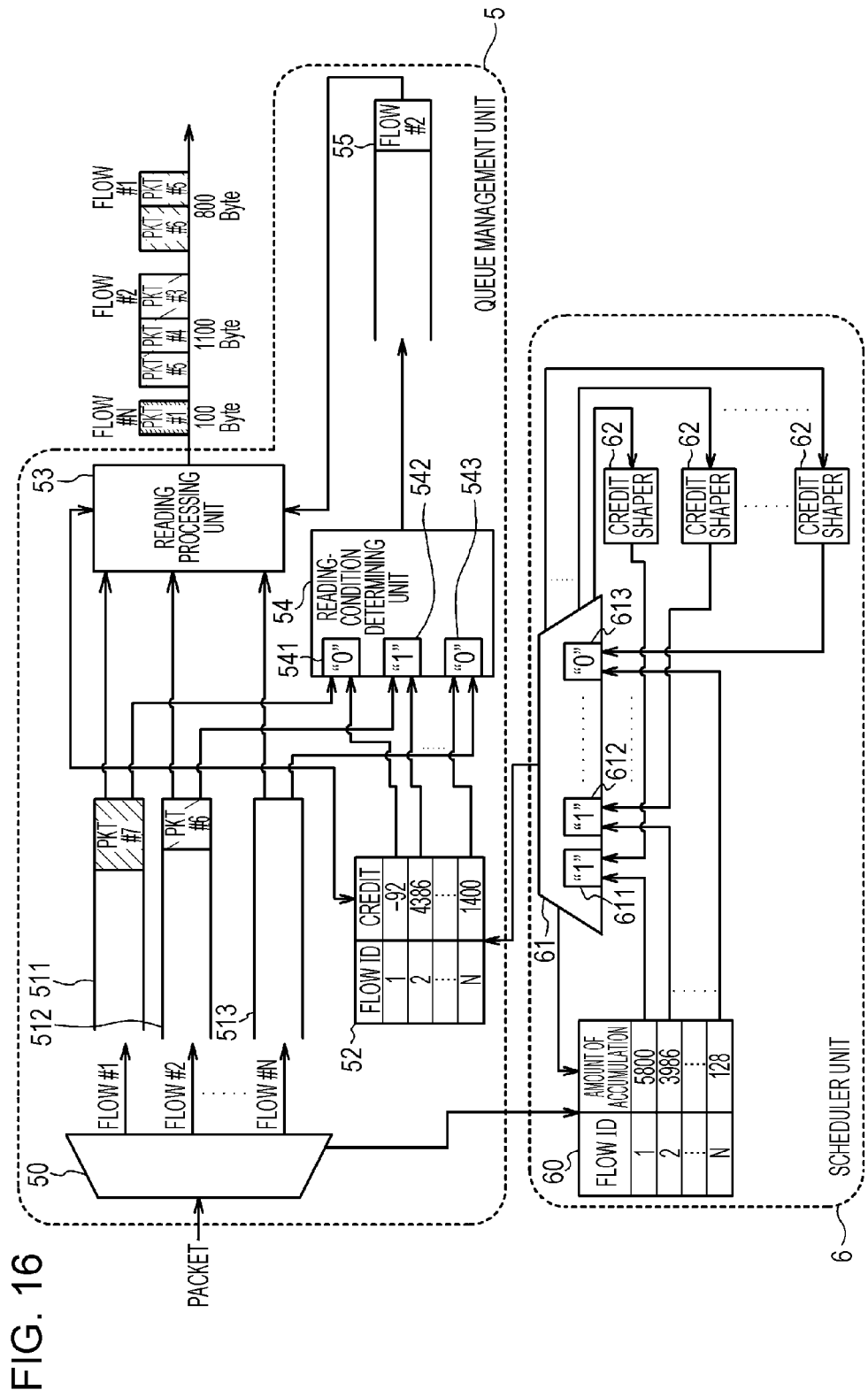
FIG. 16 illustrates an example of a state after the queue management unit in the second embodiment reads packets.

A specific example of the packet reading operation will be described with reference to FIGS. 13 and 16. FIG. 16 illustrates an example of a state after the queue management unit 5 in the second embodiment reads packets. In this example, the aforementioned predetermined amount F is assumed to be 1000 bytes. Since the state illustrated in FIG. 13 has been described above, the description thereof is not given hereinafter.

In accordance with the order of the flow IDs registered in the reading-order registration FIFO 55, the reading processing unit 53 first reads PKT#5 and PKT#6 (the total amount of data is 800 bytes) from the queue 511 for the flow #1. In this case, a credit corresponding to 800 bytes that is the length of the read PKT#5 and PKT#6 is subtracted from the credit counter for the flow #1, so that the credit counter indicates −92 bytes. At this point, the queue 511 for the flow #1 does not satisfy the reading condition (NO in step St54). Thus, the reading processing unit 53 ends the packet reading from the queue 511 for the flow #1. In this case, the reading-condition determining unit 54 does not re-register the flow #1 in the reading-order registration FIFO 55.

Next, the reading processing unit 53 sequentially reads PKT#3 to PKT#5 (the total amount of data is 1100 bytes) from the queue 512 for the flow #2. In this case, a credit corresponding to 1100 bytes that is the length of the read PKT#3 to PKT#5 is subtracted from the credit counter for the flow #2, so that the credit counter indicates 4386 bytes. At this point, although the queue 512 for the flow #2 satisfies the reading condition (YES in step St54), the amount of data in the read packets has reached the predetermined amount F (NO in step St55). Thus, the reading-condition determining unit 54 re-registers the flow #2 in the reading-order registration FIFO 55 in step St56, and the reading processing unit 53 ends the packet reading from the queue 512 for the flow #2.

Lastly, the reading processing unit 53 reads PKT#1 (the amount of data is 100 bytes) from the queue 513 for the flow #N. In this case, a credit corresponding to 100 bytes that is the length of the read PKT#1 is subtracted from the credit counter for the flow #N, so that the credit counter indicates 1400 bytes. At this point, since the queue 513 for the flow #N becomes empty, the reading condition is not satisfied (NO in step St54). Thus, the reading processing unit 53 ends the packet reading from the queue 513 for the flow #N. In this case, the reading-condition determining unit 54 does not re-register the flow #N in the reading-order registration FIFO 55.

The reading processing unit 53 sequentially reads packets from any of the queues 511 to 513 which satisfies the reading condition, until the amount of data in the read packets reaches the predetermined amount F. Accordingly, although the traffic burstiness is increased compared with the first embodiment, the frequency of the reading processing is reduced compared with the first embodiment and thus the load on the reading processing unit 53 is reduced.

Third Embodiment

In the second embodiment, the reading processing unit 53 sequentially reads packets until the amount of data in the read packets reaches the predetermined amount F, but the present technology is not limited thereto. For example, the reading processing unit 53 may sequentially read packets as long as the reading condition is satisfied.

Figure 17:
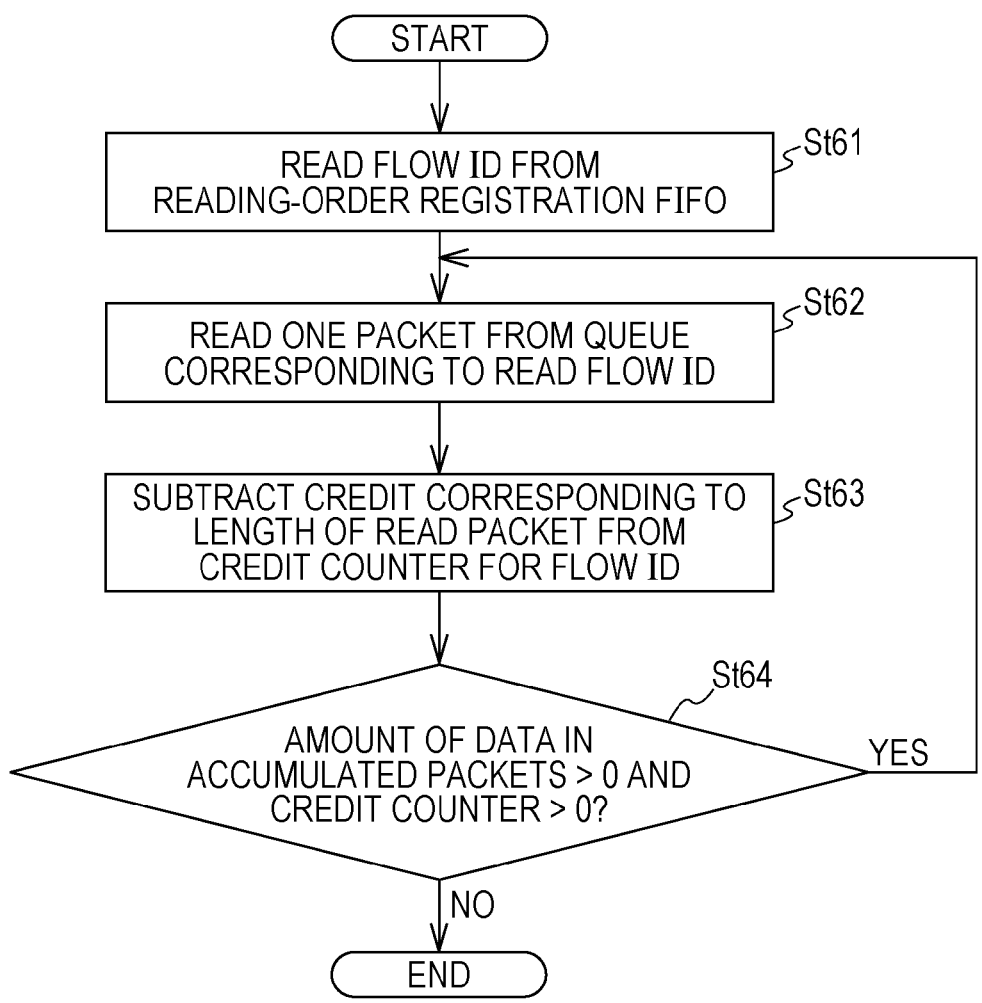
FIG. 17 is a flowchart illustrating an operation of the queue management unit in a third embodiment when packets are read.

FIG. 17 is a flowchart illustrating an operation of the queue management unit 5 in a third embodiment when packets are read. First, in step St61, the reading processing unit 53 reads a first flow ID from the reading-order registration FIFO 55.

Next, in step St62, the reading processing unit 53 reads one packet from the queue 511, 512, or 513 corresponding to the read flow ID. In step St63, the reading processing unit 53 subtracts a credit corresponding to the length of the read packet from the credit counter for the flow ID.

In step St64, the reading-condition determining unit 54 determines whether or not the reading condition that the amount of data in packets accumulated in the queue 511, 512, or 513 corresponding to the flow ID is larger than 0 and the credit counter for the flow ID is larger than 0 is satisfied. When the reading condition is not satisfied (NO in step St64), the queue management unit 5 ends the processing. In the present embodiment, the reading condition is not satisfied when the reading operation is completed, unlike the case in the above-described embodiment, and thus, the flow ID is not re-registered.

On the other hand, when the reading condition is satisfied (YES in step St64), the process in step St62 is performed again. The queue management unit 5 performs processing as described above, when a packet is read.

Figure 18:
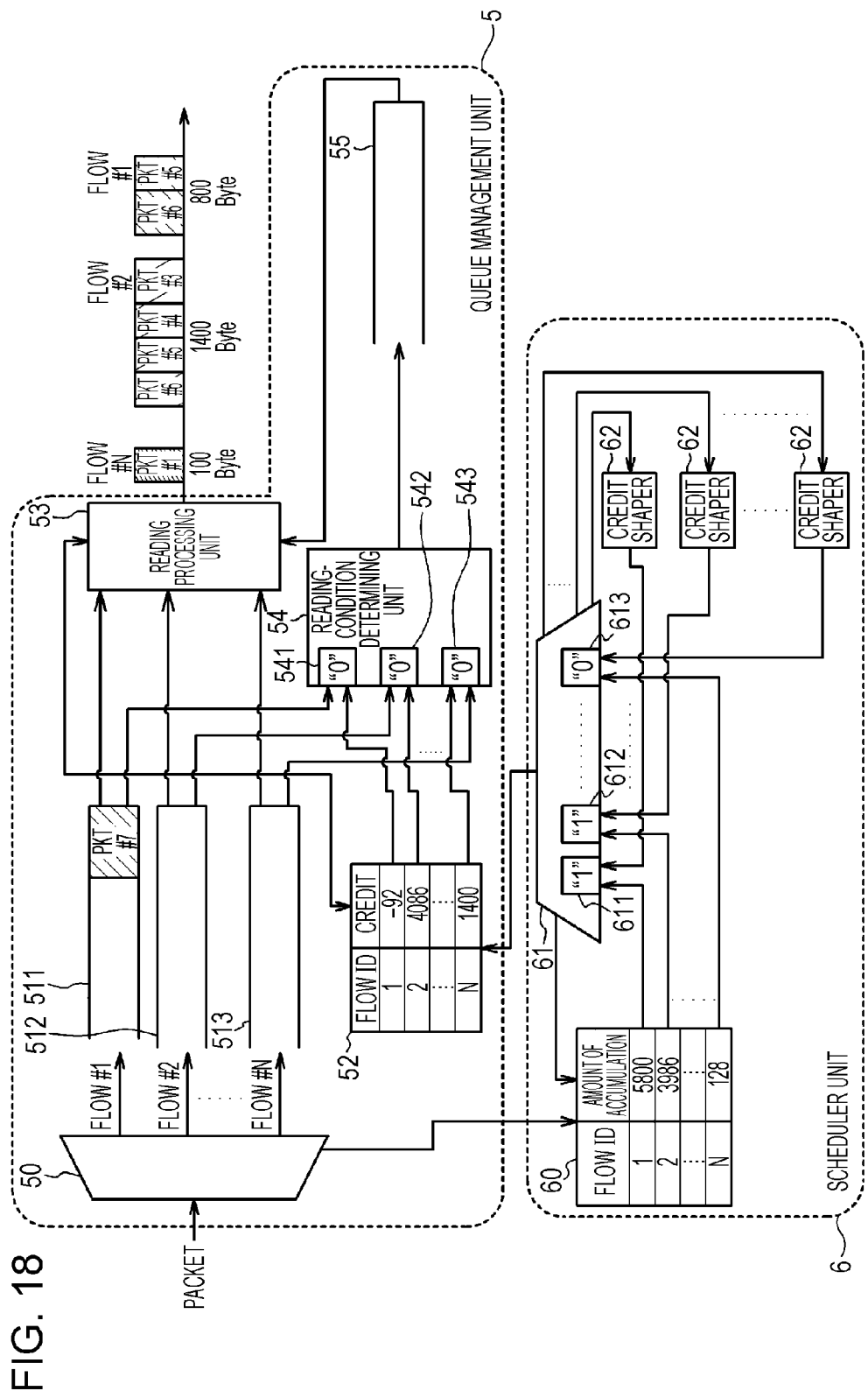
FIG. 18 illustrates an example of a state after the queue management unit in the third embodiment reads packets.

A specific example of the packet reading operation will now be described with reference to FIGS. 13 and 18. FIG. 18 illustrates an example of a state after the queue management unit 5 in the third embodiment reads packets. Since the state illustrated in FIG. 13 has been described above, the description thereof is not given hereinafter.

First, in accordance with the order of the flow IDs registered in the reading-order registration FIFO 55, the reading processing unit 53 sequentially reads PKT#5 and PKT#6 (the total amount of data is 800 bytes) from the queue 511 for the flow #1. In this case, a credit corresponding to 800 bytes that is the length of the read PKT#5 and PKT#6 is subtracted from the credit counter for the flow #1, so that the credit counter indicates −92 bytes. At this point, the queue 511 for the flow #1 does not satisfy the reading condition (NO in step St64). Thus, the reading processing unit 53 ends the packet reading from the queue 511 for the flow #1.

Next, the reading processing unit 53 sequentially reads PKT#3 to PKT#6 (the amount of data is 1400 bytes) from the queue 512 for the flow #2. In this case, a credit corresponding to 1400 bytes that is the length of the read PKT#3 to PKT#6 is subtracted from the credit counter for the flow #2, so that the credit counter indicates 4086 bytes. At this point, since the queue 512 for the flow #2 becomes empty, the reading condition is not satisfied (NO in step St64). Thus, the reading processing unit 53 ends the packet reading from the queue 512 for the flow #2.

Lastly, the reading processing unit 53 reads PKT#1 (the amount of data is 100 bytes) from the queue 513 for the flow #N. In this case, a credit corresponding to 100 bytes that is the length of the read PKT#1 is subtracted from the credit counter for the flow #N, so that the credit counter reaches 1400 bytes. At this point, since the queue 513 for the flow #N becomes empty, the reading condition is not satisfied (NO in step St64). Thus, the reading processing unit 53 ends the packet reading from the queue 513 for the flow #N.

As described above, the reading processing unit 53 sequentially reads packets from any of the queues 511 to 513 which satisfies the reading condition, as long as the reading condition is satisfied. Consequently, the traffic burstiness is increased compared with the first and second embodiments. However, since the frequency of the reading processing is reduced compared with the first and second embodiments, the load on the reading processing unit 53 is further reduced.

Fourth Embodiment

In each embodiment described above, the reading processing unit 53 reads a flow ID from one reading-order registration FIFO 55, but the present technology is not limited thereto. For example, the reading processing unit 53 may read a flow ID from a plurality of reading-order registration FIFOs corresponding to a plurality of ports.

Figure 19:
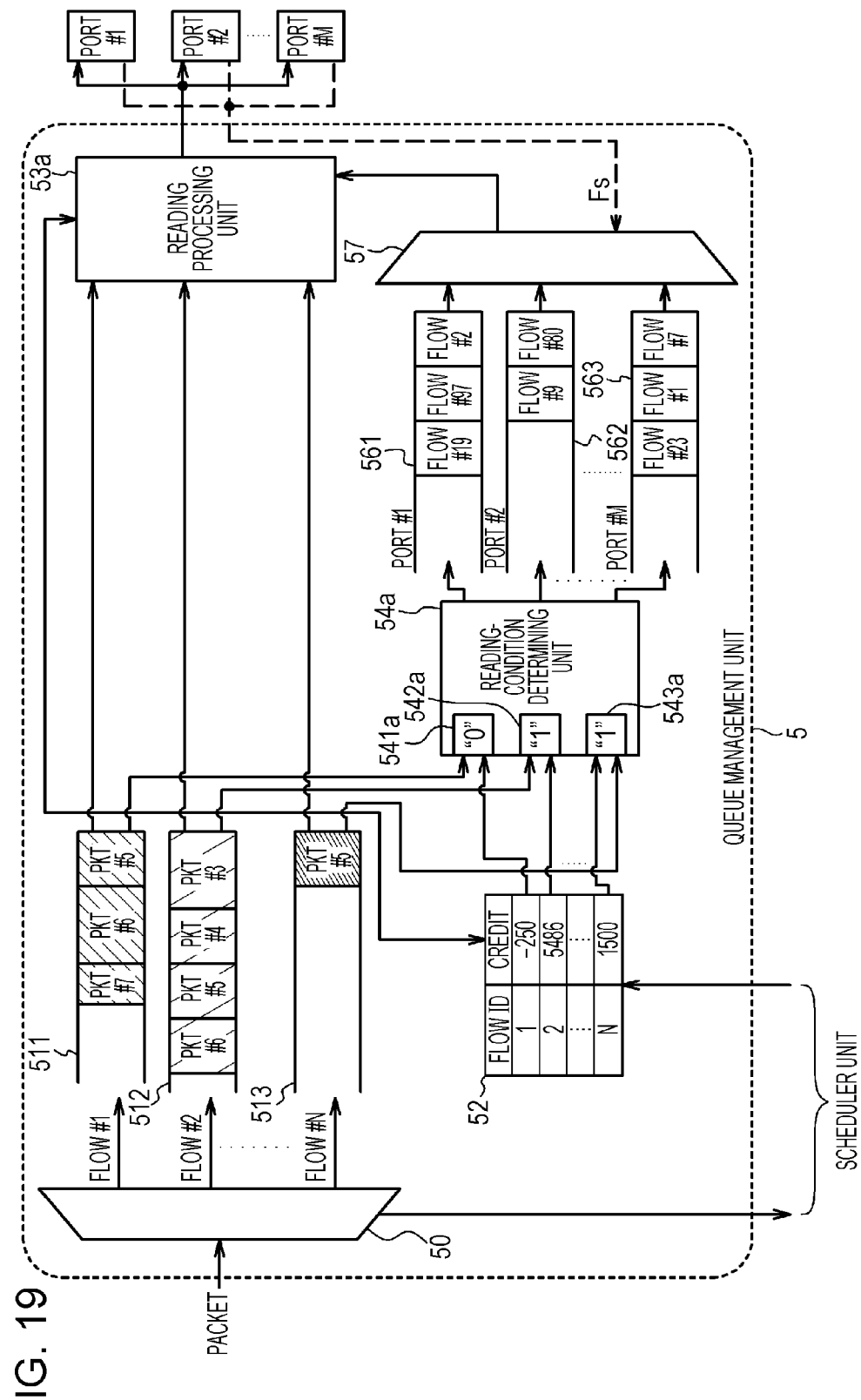
FIG. 19 is a block diagram illustrating the configuration of a queue management unit in a fourth embodiment.

FIG. 19 is a block diagram illustrating the configuration of a queue management unit 5 in a fourth embodiment. In FIG. 19, elements that are the same as or similar to those in FIG. 9 are denoted by the same reference numerals, and descriptions thereof are not given hereinafter.

An output processing unit 13 has the queue management unit 5, a scheduler unit 6, and a plurality of ports #1 to #M. The queue management unit 5 has a distributing unit 50, queues 511 to 513, a credit counter unit 52, a reading processing unit 53a, a reading-condition determining unit 54a, reading-order registration FIFOs (reading-order registering units) 561 to 563, and a selection processing unit 57. The scheduler unit 6 has a configuration as described above with reference to FIGS. 6 to 9.

As described above, the output processing unit 13 transmits packets, read by the reading processing unit 53a, to an external apparatus via the ports #1 to #M. The reading-order registration FIFOs 561 to 563 correspond to the ports #1 to #M, respectively. Flow identifiers (IDs) for the queues 511 to 513 are registered in the reading-order registration FIFOs 561 to 563 in the order in which the reading condition is satisfied.

The reading-condition determining unit 54a determines whether or not the reading condition is satisfied for each of the queues 511 to 513. The reading-condition determining unit 54a registers, in the reading-order registration FIFOs 561 to 563 for the ports #1 to #M, the flow ID of the queue 511, 512, or 513 that satisfies the reading condition. In this case, information indicating associations between the flow IDs and the ports #1 to #M is pre-stored in the reading-condition determining unit 54a. The reading-condition determining unit 54a has reading flags 541a to 543a that are analogous to those in the above-described embodiments.

The selection processing unit 57 selects one of the reading-order registrations FIFOs 561 to 563 and outputs, to the reading processing unit 53a, the first flow ID registered in the selected reading-order registration FIFO 561, 562, or 563. In accordance with a round robin system or the like, the selection processing unit 57 selects one of the reading-order registrations FIFOs 561 to 563. The number "M" of ports in one output processing unit 13 is at most a few dozens, which is small compared with the number of flow IDs (up to several tens of thousands of flow IDs). Thus, the load of the selection processing performed by the selection processing unit 57 is lower than the load of other scheduling processing, so that the throughput of the network interface card 1 does not decrease.

The reading processing unit 53a reads a packet from one of the queues 511 to 513 which corresponds to the flow ID input from the selection processing unit 57 and outputs the read packet to one of the ports #1 to #M which corresponds to that queue 511, 512, or 513. Thus, according to the present embodiment, it is possible to guarantee the fairness among the throughputs of the ports #1 to #M.

When the network interface card 1 receives a flow control signal Fs from an external apparatus via any of the ports #1 to #M, the selection processing unit 57 excludes, from the reading-order registration FIFO to be selected, the reading-order registration FIFO 561, 562, or 563 corresponding to that port. When the amount of traffic output from the network interface card 1 to the external apparatus reaches a certain amount or more, the flow control signal Fs is transmitted in order to reduce the amount of traffic.

Accordingly, in accordance with a request from the external apparatus, the network interface card 1 can stop transmission of packets to the external apparatus, thus making it possible to reduce the load of traffic in the external apparatus. The flow control performed using the flow control signal Fs is defined in, for example, IEEE802.3x (IEEE: The Institute of Electrical and Electronics Engineers, Inc.).

Fifth Embodiment

For example, when a packet exceeding a predetermined amount of data is read as bursty traffic as in the second and third embodiments, there is a concern that the amount of traffic exceeds the communication bandwidth of each of the ports #1 to #M to thereby cause packet loss. Accordingly, it is desired that a buffer for dealing with bursty traffic be provided at a subsequent stage of the reading processing unit 53 or 53a.

Figure 20:
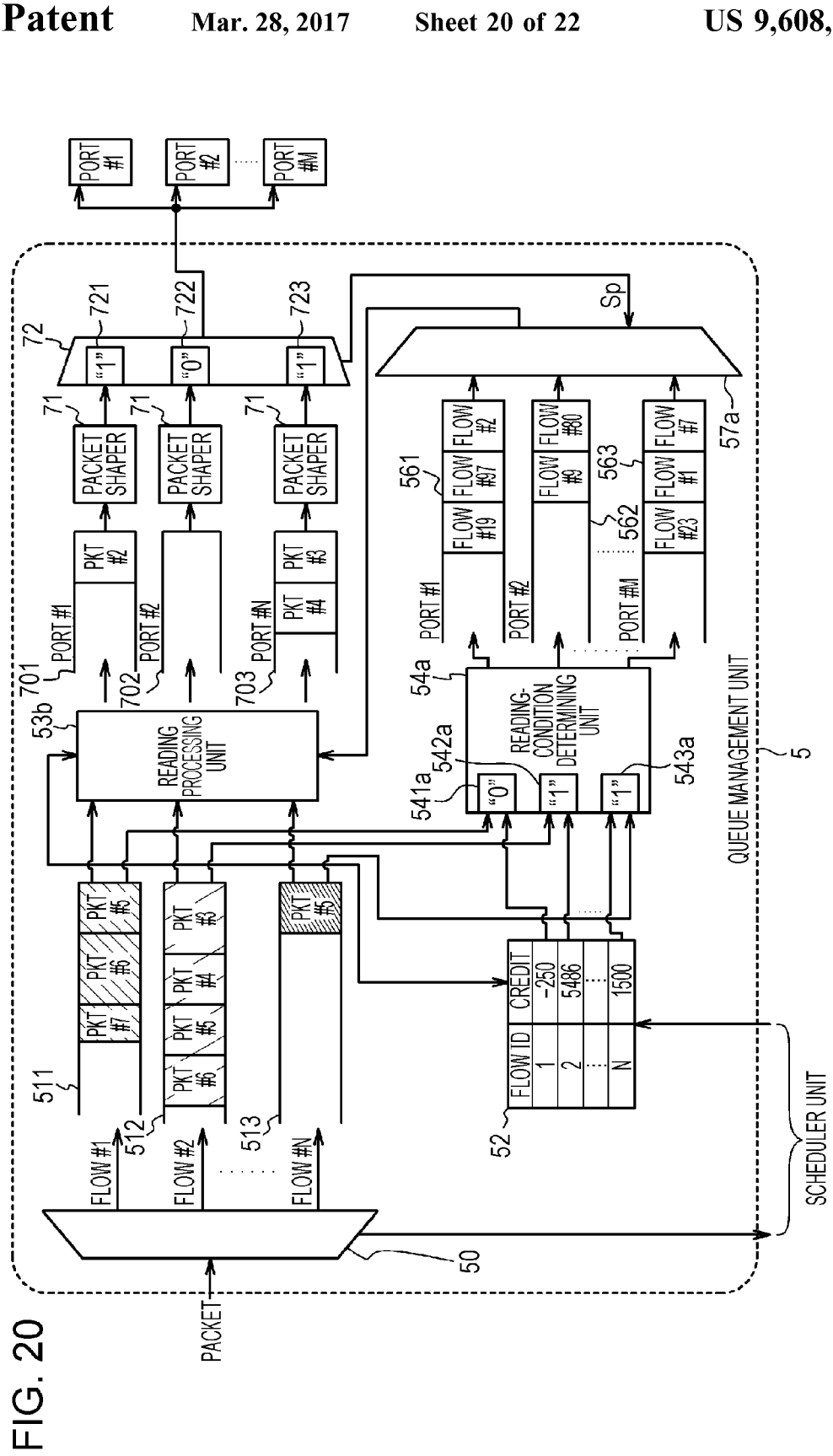
FIG. 20 is a block diagram illustrating the configuration of a queue management unit in a fifth embodiment.

FIG. 20 is a block diagram illustrating the configuration of a queue management unit 5 in a fifth embodiment. In FIG. 20, elements that are the same as or similar to those in FIG. 19 are denoted by the same reference numerals, and descriptions thereof are not given hereinafter.

An output processing unit 13 has the queue management unit 5, a scheduler unit 6, and ports #1 to #M. The queue management unit 5 has a distributing unit 50, queues 511 to 513, a credit counter unit 52, a reading processing unit 53b, a reading-condition determining unit 54a, reading-order registration FIFOs 561 to 563, and a selection processing unit 57a. The queue management unit 5 further has output queues 701 to 703, packet shapers 71, and an output-band control unit 72. The scheduler unit 6 has a configuration as described above with reference to FIGS. 6 to 9.

The output queues 701 to 703 are packet storages, such as FIFOs, and accumulate packets output from the reading processing unit 53b to the corresponding ports #1 to #M. The reading processing unit 53b sorts and stores packets in the output queues 701 to 703 for the respective ports #1 to #M to which the packets are to be output. The sorting processing is performed, for example, based on the flow IDs of packets.

The packet shapers 71 adjust the intervals of packets respectively read from the output queues 701 to 703. Each packet shaper 71 has, for example, a token bucket for storing tokens handled as the right to transmit packets and restricts packet reading in accordance with the remaining amount of tokens. Each packet shaper 71 adjusts the intervals of packets in accordance with a token supply rate.

The output-band control unit 72 reads packets from the output queues 701 to 703 via the packet shapers 71. For example, in accordance with a round robin system, the output-band control unit 72 determines a reading-target queue from readable queue(s) of the output queues 701 to 703. The read packets are transmitted to external apparatuses via the ports #1 to #N.

The output-band control unit 72 has output flags 721 to 723 that each indicates whether or not a packet is readable from the corresponding output queue 701, 702, or 703. Each of the output flags 721 to 723 indicates "1", when a packet is readable, and indicates "0", when no packet is readable.

With respect to each of the output queues 701 to 703, the output-band control unit 72 determines whether or not the output condition that the amount of data in accumulated packets is larger than 0 and the remaining amount of tokens in the corresponding packet shaper 71 is larger than 0. The output flags 721 to 723 for the output queues 701 to 703 that satisfy the output condition are set to "1", whereas the output flags 721 to 723 for the output queues 701 to 703 that do not satisfy the output condition are set to "0".

In the example in FIG. 20, since only the output queue 702 of the output queues 701 to 703 is empty, the output flag 722 indicates "0" and the other output flags 721 and 723 indicate "1". In accordance with a round robin system or the like, the scheduler unit 93 selects one of, of the output queues 701 to 703, the output queues 701 and 703 for which the output flags 721 and 723 indicate "1", and reads a packet from the selected output queue 701 or 703.

When the amount of data in packets accumulated in any of the output queues 701 to 703 exceeds a predetermined threshold TH, the output-band control unit 72 outputs a stop control signal Sp to the selection processing unit 57*a*. The stop control signal Sp includes information indicating a port number (#1 to #M) corresponding to that output queue 701, 702, or 703.

In accordance with the stop control signal Sp, the selection processing unit 57*a* excludes, from the reading-order registration FIFO to be selected, the reading-order registration FIFO 561, 562, or 563 corresponding to, of the ports #1 to #M, the port to which packets accumulated in the corresponding output queue 701, 702 or 703 are output, the amount of data in the packets exceeding the predetermined threshold TH. More specifically, the selection processing unit 57*a* excludes, from the reading-order registration FIFO to be selected, one of the reading-order registrations FIFOs 561 to 563 which correspond to the port number indicated by the stop control signal Sp.

Figure 21:
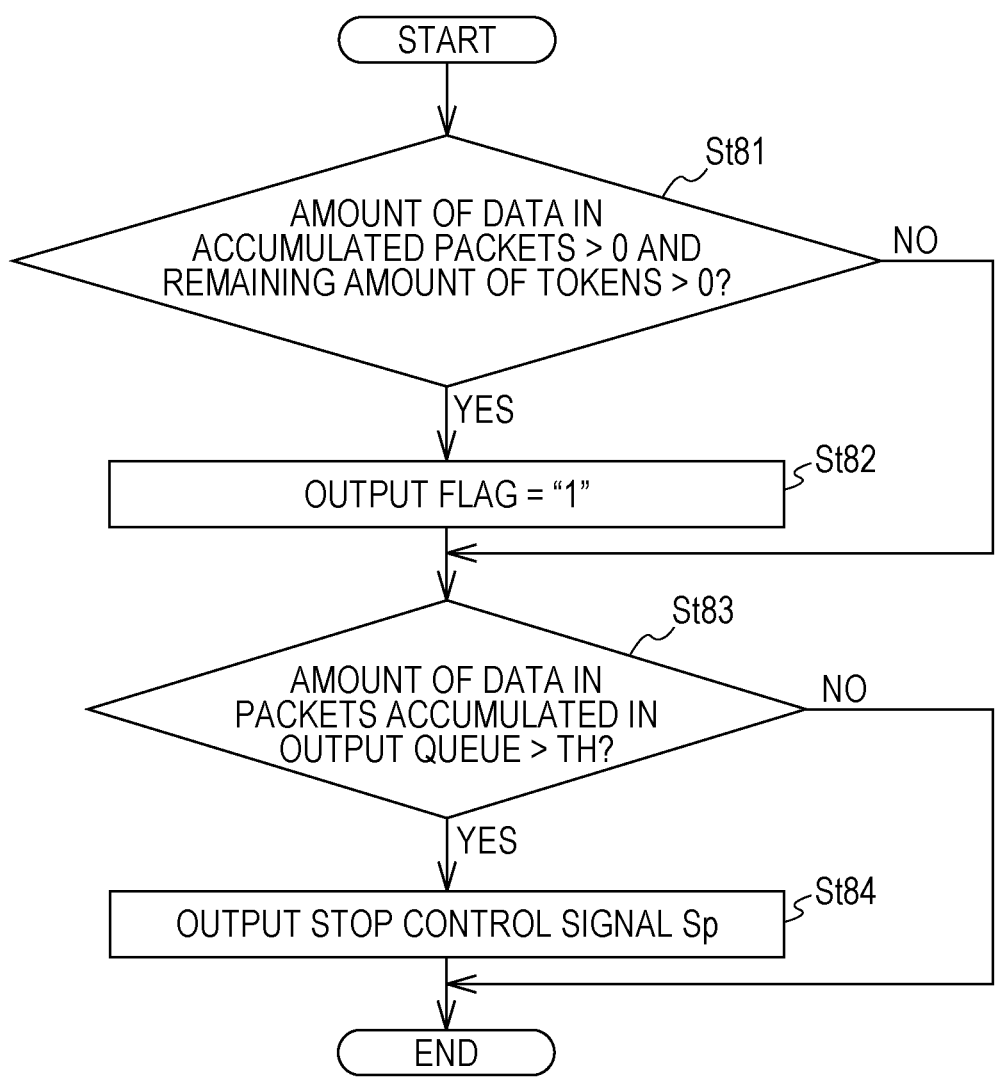
FIG. 21 is a flowchart illustrating an operation example of an output-band control unit when packets are stored in the output queues.

FIG. 21 is a flowchart illustrating an operation example of the output-band control unit 72 when packets are stored in the output queues 701 to 703. First, in step St81, with respect to each of the output queues 701 to 703, the output-band control unit 72 determines whether or not the output condition that the amount of data in accumulated packets is larger than 0 and the amount of tokens remaining in the corresponding packet shaper 71 is larger than 0 is satisfied.

When the output condition is satisfied (YES in step St81), the output-band control unit 72 sets the corresponding output flag 721, 722, or 723 to "1" in step St82. Next, in step St83, the output-band control unit 72 determines whether or not the amount of data in packets accumulated in the corresponding output queue 701, 702, or 703 is larger than the threshold TH. This determination processing is performed when the output condition is not satisfied (NO in step St81).

When the amount of data in packets is larger than the predetermined threshold TH (YES in step St83), the output-band control unit 72 outputs the stop control signal Sp to the selection processing unit 57*a* in step St84 and ends the processing. On the other hand, when the amount of data in packets is smaller than or equal to the predetermined threshold TH (NO in step St83), the output-band control unit 72 does not output the stop control signal Sp and ends the processing. The output-band control unit 72 performs processing as described above, when a packet is stored.

FIG. 22 is a flowchart illustrating an operation example of the output-band control unit 72 when a packet is read from the output queues 701 to 703. In step St91, the output-band control unit 72 selects one of the output queues 701 to 703 for which the output flags 721 to 723 indicate "1" and reads a packet from the selected output queue 701, 702, or 703.

Next, in step St92, the output-band control unit 72 subtracts a token corresponding to the length of the read packet from tokens in the packet shaper 71 corresponding to the selected output queue 701, 702, or 703. In step St93, the output-band control unit 72 determines whether or not the output condition that the amount of data in packets accumulated in the selected output queue 701, 702, or 703 is larger than 0 and the amount of tokens remaining in the corresponding packet shaper 71 is larger than 0.

When the output condition is not satisfied (NO in step St93), the output-band control unit 72 sets the corresponding output flag 721, 722, or 723 to "0" in step St94. Next, in step St95, the output-band control unit 72 determines whether or not the stop control signal Sp is being output via one of the ports #1 to #M which corresponds to the selected output queue 701, 702, or 703. This determination processing is also performed when the output condition is satisfied (YES in step St93).

When the stop control signal Sp is being output (YES in step St95), the process proceeds to step St96 in which the output-band control unit 72 determines whether or not the amount of data in packets accumulated in the selected output queue 701, 702, or 703 is larger than the predetermined threshold TH. On the other hand, when the stop control signal Sp is being output (NO in step St95), the output-band control unit 72 ends the processing.

When the amount of data in packets is smaller than or equal to the predetermined threshold TH (NO in step St96), the output-band control unit 72 stops the output of the stop control signal Sp in step St97. On the other hand, when the amount of data in packets is larger than the predetermined threshold TH (YES in step St96), the output-band control unit 72 ends the processing. The output-band control unit 72 performs processing as described above, when a packet is read.

In the present embodiment, since the output queues 701 to 703 are provided at the subsequent stage of the reading processing unit 53 or 53*a*, it is possible to deal with bursty traffic output to the ports #1 to #M. When the amount of data in packets accumulated in any of the output queues 701 to 703 is larger than the predetermined threshold TH, the stop control signal Sp is output to the selection processing unit 57a to stop reading of packets in the corresponding flow. Thus, the so-called back pressure control causes traffic having certain burstiness to be output to thereby reduce packet loss in the functional unit at the subsequent stage in the output processing unit 13.

As described above, the packet exchanging device (the network interface card) 1 according to each embodiment has the queues 511 to 513 that each accumulate therein one or more packets, the scheduler unit 6 that gives a certain credit to each of the queues 511 to 513, and the reading processing unit 53. By consuming a credit, the reading processing unit 53 reads packets from the queues 511 to 513 in the order in which the reading condition regarding a credit for each queue and the amount of data in packets accumulated in each queue is satisfied.

As described above, the scheduler unit 6 is provided independently from the reading processing unit 53 that reads packets, and gives a certain credit to each of the queues 511 to 513. The reading processing unit 53 reads packets from each of the queues 511 to 513 by consuming a credit.

Accordingly, in the packet exchanging device 1 according to each embodiment, the amount of packets read from the queues 511 to 513 are controlled based on credits, so that the fairness among the queues 511 to 513 is guaranteed. In addition, as long as a credit remains, packets are read from the queues 511 to 513. Thus, even when short packets having small packet lengths are continuously stored, it is possible to read the short packets with a small amount of delay by consuming a credit.

Also, the reading processing unit 53 sequentially reads packets from the queues 511 to 513 in the order in which the reading condition regarding the credit for each queue and the amount of data in packets accumulated in each queue is satisfied. As a result, without performing search processing that involves a large amount of time, the reading processing unit 53 can select the queues 511 to 513 by simple low-load processing to read packets therefrom. Thus, the packet exchanging device 1 according to the embodiment makes it possible to effectively enhance the throughput.

The transmission apparatus according to the embodiment includes: packet exchanging devices 1 transmit packets to and receive packets from an external apparatus, and a switch card 2 that exchanges the packets with the packet exchanging devices 1. Each packet exchanging device 1 accumulates packets, input from the switch card 2, in the queues 511 to 513, and transmits packets, read from the queues 511 to 513, to an external apparatus.

The transmission apparatus according to the embodiment offers the above-described operational effects, since it includes the above-described packet exchanging devices 1. The operational effects can be obtained when at least one of the packet exchanging devices 1 provided in the transmission apparatus is the packet exchanging device 1 according to the embodiment.

A packet scheduling method according to the embodiment includes, processes (1) and (2) below:
(1) a process of giving a certain credit to each of the queues 511 to 513 in which packets are accumulated; and
(2) a process of reading packets from the queues 511 to 513 in the order in which a reading condition regarding a credit for each queue and the amount of data in packets accumulated in each queue, by consuming the credit.

The packet scheduling method offers the above-described operational effects, since the configuration that is the same as or similar to the configuration of the packet exchanging device 1 is used.

Although the contents of the present disclosure have been specifically described above with reference to the preferred embodiments, it is apparent to those skilled in the art that various modification and changes are possible based on the basic technical spirit and the teaching of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A packet exchanging device comprising:
at least one processor or at least one electronic circuit; and
a memory which stores a plurality of instructions, which when executed by the at least one processor or the at least one electronic circuit, cause the at least one processor or the at least one electronic circuit to execute:
giving a permissible reading amount indicating amounts of data of readable packets to each of queues, one or more packets being accumulated in each of the queues;
reading the one or more packets from the queues by the permissible reading amount in an order in which a reading condition regarding the permissible reading amount for each queue and an amount of data in the one or more packets accumulated in each queue is satisfied;
transmitting, from ports, the one or more packets read to an external apparatus;
registering, by reading-order registers, therein identifiers of the queues in an order in which the reading condition is satisfied, the reading-order registers corresponding to the ports, respectively; and
selecting one of the reading-order registers and outputting, to the reading, a first one of the identifiers registered in the selected reading-order register,
wherein the one or more packets is read from any of the queues which corresponds to the identifier input from the selector and the read one or more packets is output to any of the ports which corresponds to the queue from which the one or more packets are read.
2. The packet exchanging device according to claim 1, wherein the reading condition is that the permissible reading amount is larger than 0 and an amount of data in the one or more packets accumulated in the corresponding queue is larger than 0.
3. The packet exchanging device according to claim 1, wherein the permissible reading amount is given to, of the queues, the queue in which the amount of data in the accumulated one or more packets is larger than or equal to an amount.
4. The packet exchanging device according to claim 1, wherein the one or more packets are read one by one from any of the queues which satisfies the reading condition.
5. The packet exchanging device according to claim 1, wherein the one or more packets are sequentially read from any of the queues which satisfies the reading condition, until an amount of data in read packets reaches a predetermined amount.

6. The packet exchanging device according to claim 1, wherein the one or more packets are sequentially read from any of the queues which satisfies the reading condition, as long as the reading condition is satisfied.

7. The packet exchanging device according to claim 1, the at least one processor or the at least one electronic circuit further executing:
accumulating in output queues the one or more packets output to the ports; and
outputting a stop control signal to the selecting, when the amount of data in the one or more packets accumulated in any of the output queues exceeds a predetermined threshold,
wherein, in accordance with the stop control signal, the selecting excludes, from a reading-order register to be selected, the reading-order register corresponding to the port to which the one or more packets accumulated in the output queue are output, the amount of data of the one or more packets exceeding the predetermined threshold.

8. A transmission apparatus, comprising:
packet exchanging devices configured to transmit packets to and receive packets from an external apparatus; and
a switch device configured to exchange the packets with the packet exchanging devices;
wherein at least one of the packet exchanging devices comprises:
at least one processor or at least one electronic circuit; and
a memory which stores a plurality of instructions, which when executed by the at least one processor or the at least one electronic circuit, cause the at least one processor or the at least one electronic circuit to execute:
giving a permissible reading amount indicating amounts of data of readable packets to each of queues, one or more packets being accumulated in each of the queues;
reading the one or more packets from the queues by the permissible reading amount in an order in which a reading condition regarding the permissible reading amount for each queue and an amount of data in the one or more packets accumulated in each queue is satisfied;
transmitting, from ports, the one or more packets read to an external apparatus;
registering, by reading-order registers, therein identifiers of the queues in an order in which the reading condition is satisfied, the reading-order registers corresponding to the ports, respectively; and
selecting one of the reading-order registers and outputting, to the reading, a first one of the identifiers registered in the selected reading-order register,
wherein the one or more packets is read from any of the queues which corresponds to the identifier input from the selector and the read one or more packets is output to any of the ports which corresponds to the queue from which the one or more packets are read.

9. A packet scheduling method comprising:
giving a permissible reading amount indicating amounts of data of readable packets to each of queues, one or more packets being accumulated in each of the queues;
reading the one or more packets from the queues by consuming the permissible reading amount in an order in which a reading condition regarding the permissible reading amount for each queue and an amount of data in the one or more packets accumulated in each queue is satisfied;
transmitting, from ports, the one or more packets read to an external apparatus;
registering, by reading-order registers, therein identifiers of the queues in an order in which the reading condition is satisfied, the reading-order registers corresponding to the ports, respectively; and
selecting one of the reading-order registers and outputting, to the reading, a first one of the identifiers registered in the selected reading-order register,
wherein the one or more packets is read from any of the queues which corresponds to the identifier input from the selector and the read one or more packets is output to any of the ports which corresponds to the queue from which the one or more packets are read.

10. The packet scheduling method according to claim 9, wherein the reading condition is that the permissible reading amount is larger than 0 and an amount of data in the one or more packets accumulated in the corresponding queue is larger than 0.

11. The packet scheduling method according to claim 9, wherein the permissible reading amount is given to, of the queues, the queue in which the amount of data in the accumulated one or more packets is larger than or equal to an amount.

12. The packet scheduling method according to claim 9, wherein the one or more packets are read one by one from any of the queues which satisfies the reading condition.

13. The packet scheduling method according to claim 9, wherein the one or more packets are sequentially read from any of the queues which satisfies the reading condition, until an amount of data in read packets reaches a predetermined amount.

14. The packet scheduling method according to claim 9, wherein the one or more packets are sequentially read from any of the queues which satisfies the reading condition, as long as the reading condition is satisfied.

* * * * *